United States Patent
Matsuoka

(10) Patent No.: US 9,559,937 B2
(45) Date of Patent: Jan. 31, 2017

(54) APPARATUS AND METHOD FOR RELAYING COMMUNICATION BETWEEN NODES COUPLED THROUGH RELAY DEVICES

(71) Applicant: FUJITSU LIMITED, Kawasaki-shi, Kanagawa (JP)

(72) Inventor: Naoki Matsuoka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 215 days.

(21) Appl. No.: 14/086,583

(22) Filed: Nov. 21, 2013

(65) Prior Publication Data

US 2014/0204937 A1 Jul. 24, 2014

(30) Foreign Application Priority Data

Jan. 24, 2013 (JP) ................................ 2013-011551

(51) Int. Cl.
*H04L 12/755* (2013.01)
*H04L 12/46* (2006.01)

(52) U.S. Cl.
CPC ......... *H04L 45/021* (2013.01); *H04L 12/4641* (2013.01)

(58) Field of Classification Search
CPC ..... H04L 45/00; H04L 45/021; H04L 12/4641
See application file for complete search history.

(56) References Cited

U.S. PATENT DOCUMENTS

| | | | | |
|---|---|---|---|---|
| 2003/0137932 A1* | 7/2003 | Nishioka | ............. | H04L 41/0668 370/216 |
| 2007/0183317 A1* | 8/2007 | Vasseur | .................... | H04J 3/14 370/225 |
| 2008/0155169 A1* | 6/2008 | Hiltgen | ................. | G06F 9/5077 711/6 |
| 2009/0240790 A1 | 9/2009 | Utsunomiya et al. | | |
| 2011/0238820 A1 | 9/2011 | Matsuoka | | |
| 2013/0074174 A1* | 3/2013 | Huang | ................... | H04L 45/04 726/12 |
| 2013/0282867 A1 | 10/2013 | Otake | | |
| 2014/0075047 A1* | 3/2014 | Narasimhan | ........ | H04L 41/0813 709/238 |

FOREIGN PATENT DOCUMENTS

| | | |
|---|---|---|
| JP | 2000-134248 | 5/2000 |
| JP | 2009-232207 | 10/2009 |
| JP | 2011-176504 | 9/2011 |
| JP | 2011-198299 | 10/2011 |
| JP | 2012-65015 | 3/2012 |
| WO | 2012/090996 A1 | 7/2012 |

OTHER PUBLICATIONS

Japanese Office Action mailed Jul. 5, 2016 in related Japanese Application No. 2013-011551.

* cited by examiner

*Primary Examiner* — Andrew Lai
*Assistant Examiner* — Sumitra Ganguly
(74) *Attorney, Agent, or Firm* — Staas & Halsey LLP

(57) ABSTRACT

An apparatus is configured to relay communication between first and second nodes that area coupled through a plurality of relay devices. The apparatus generates control information indicating that communication from the second node to the first node is to be performed via the computer, in response to request for migration of relay processing from another apparatus to the apparatus, the relay processing including relaying communication between the first and second nodes, and sends the generated control information to the plurality of relay devices.

7 Claims, 18 Drawing Sheets

FIG. 4

| | 400 | 46 | 46 | |
|---|---|---|---|---|
| | VIRTUAL FW | APPLICATION | APPLICATION | |
| | OS | OS | OS | ~45 |
| | VM | VM | VM | ~44 |
| | HV | | | ~43 |
| | OS | | | ~42 |
| | HARDWARE | | | ~41 |

FIG. 7

| FIRST VM INFORMATION | | | SECOND VM INFORMATION | | | ACTION |
|---|---|---|---|---|---|---|
| IP ADDRESS | MAC ADDRESS | VLAN-ID | IP ADDRESS | MAC ADDRESS | VLAN-ID | |
| 10.0.0.3 | 11:22:33:44:55:0a | X | 10.0.0.2 | 11:22:33:44:55:0b | Y | Pass |
| 10.0.0.5 | 11:22:33:44:55:0c | X | 10.0.0.6 | 11:22:33:44:55:0d | Y | Pass |
| .. | .. | .. | .. | .. | .. | .. |
| any | any | any | any | any | any | Discard |

APPARATUS AND METHOD FOR RELAYING COMMUNICATION BETWEEN NODES COUPLED THROUGH RELAY DEVICES

CROSS-REFERENCE TO RELATED APPLICATION

This application is based upon and claims the benefit of priority of the prior Japanese Patent Application No. 2013-011551, filed on Jan. 24, 2013, the entire contents of which are incorporated herein by reference.

FIELD

The embodiments discussed herein are related to apparatus and method for relaying communication between nodes coupled through relay devices.

BACKGROUND

Infrastructure as a Service (IaaS) using cloud computing has been available as a new way of application of an Information and Communication Technology (ICT) system configuration. The IaaS is a service that provides users with a platform implemented by a virtual server (hereinafter referred to as a "virtual machine (VM)") configured using computing resources on a network).

Users at companies and so on using the IaaS utilize VMs provided thereby to construct a desired ICT system. For example, when a user constructs a task system accessed over the Internet, a web server serving as a front-end system is constructed using a VM, and an application (AP) server and a database (DB) server serving as a back-end system are constructed using VMs.

Even in such an ICT system using VMs, the user performs firewall installation and network-zone division to execute security protection, as in typical ICT systems. For example, by using virtual local area networks (VLANs), the user divides a segment into a demilitarized zone (DMZ) to which a web server belongs and a secure zone to which a DB server belongs. The user then uses a VM (hereinafter referred to as a "virtual FW") that executes firewall functions, to control communication between the zones and communication from outside to each zone.

When a VM is migrated in a system using VMs, Gratuitous Address Resolution Protocol (GARP) is used to update setting information in network devices, such as layer 2 switches, thereby continuing the system operation.

For example, for maintenance work for a physical server, a VM that operates on this physical server is migrated to another physical server. When the migration of the VM is completed, a hypervisor executed on the migration-destination physical server broadcasts a GARP packet in which a media access control (MAC) address and an internet protocol (IP) address of the migrated VM are contained in payload. Upon receiving the GARP packet, each layer 2 switch updates a forwarding database (FDB) based on received port information and payload information in the GARP packet.

Related technologies are disclosed in Japanese Laid-open Patent Publication No. 2012-65015, Japanese Laid-open Patent Publication No. 2011-198299, Japanese Laid-open Patent Publication No. 2009-232207, and Japanese Laid-open Patent Publication No. 2000-134248.

SUMMARY

According to an aspect of the invention, an apparatus is configured to relay communication between first and second nodes that area coupled through a plurality of relay devices. The apparatus generates control information indicating that communication from the second node to the first node is to be performed via the computer, in response to request for migration of relay processing from another apparatus to the apparatus, the relay processing including relaying communication between the first and second nodes, and sends the generated control information to the plurality of relay devices.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating a layer structure of a physical server, according to an embodiment;

FIG. 7 is a diagram illustrating an example of information stored in a relay-rule DB, according to an embodiment;

DESCRIPTION OF EMBODIMENTS

However, the above-described technology has a problem in that, when a virtual FW that relay-controls communication between VMs has been migrated to another physical server, communication via the virtual FW fails to continue and is disconnected.

More specifically, even when the virtual FW has been migrated, communication with the virtual FW is established both before and after the migration. However, communication between VMs that belong to different network zones and that perform communication via the virtual FW is disconnected after the migration of the virtual FW.

For example, suppose a case in which a transparent virtual FW for relaying communication without terminating the communication has been migrated. The virtual FW stores therein, as relay rules, a rule for permitting communication between a VM (A) belonging to a network A and a VM (B) belonging to a network B. Thus, a packet sent from the VM (A) to the VM (B) or a packet sent from the VM (B) to the VM (A) arrives at the virtual FW, is controlled based on the relay rules, and is then relayed to the destination.

Under such a situation, when the virtual FW has been migrated to another physical server, the hypervisor in the migration destination broadcasts address information of the virtual FW. Thus, each L2 switch in the system receives the virtual-FW address information and registers the virtual-FW address information in the FDB in association with a reception port. This allows each L2 switch to relay a packet addressed to the virtual FW after the migration.

Meanwhile, the address information sent from the hypervisor in the migration destination is the virtual FW address information and thus does not include address information of the VM (A) and the VM (B) between which communication is to be relayed via the virtual FW. Thus, each L2 switch does not execute rewriting of the FDB regarding the VM (A) and the VM (B) after the migration of the virtual FW. Consequently, upon receiving a packet addressed to the VM (A) or the VM (B), each L2 switch relays the packet to the physical server of the pre-migration virtual FW, that is, the physical server on which the virtual FW before the migration has been operated. As a result, since the packet is relayed to the physical server on which the virtual FW does not exist, the packet relay is stopped and the communication is disconnected.

Embodiments of a relay program, a relay method, and a relay processing apparatus disclosed herein will be described in detail with reference to the accompanying drawings. The embodiments, however, are not intended to limit the present disclosure. The embodiments described below may also be combined together, as appropriate, within a range in which no contradiction occurs.

First Embodiment

Overall Configuration

Figure 1:
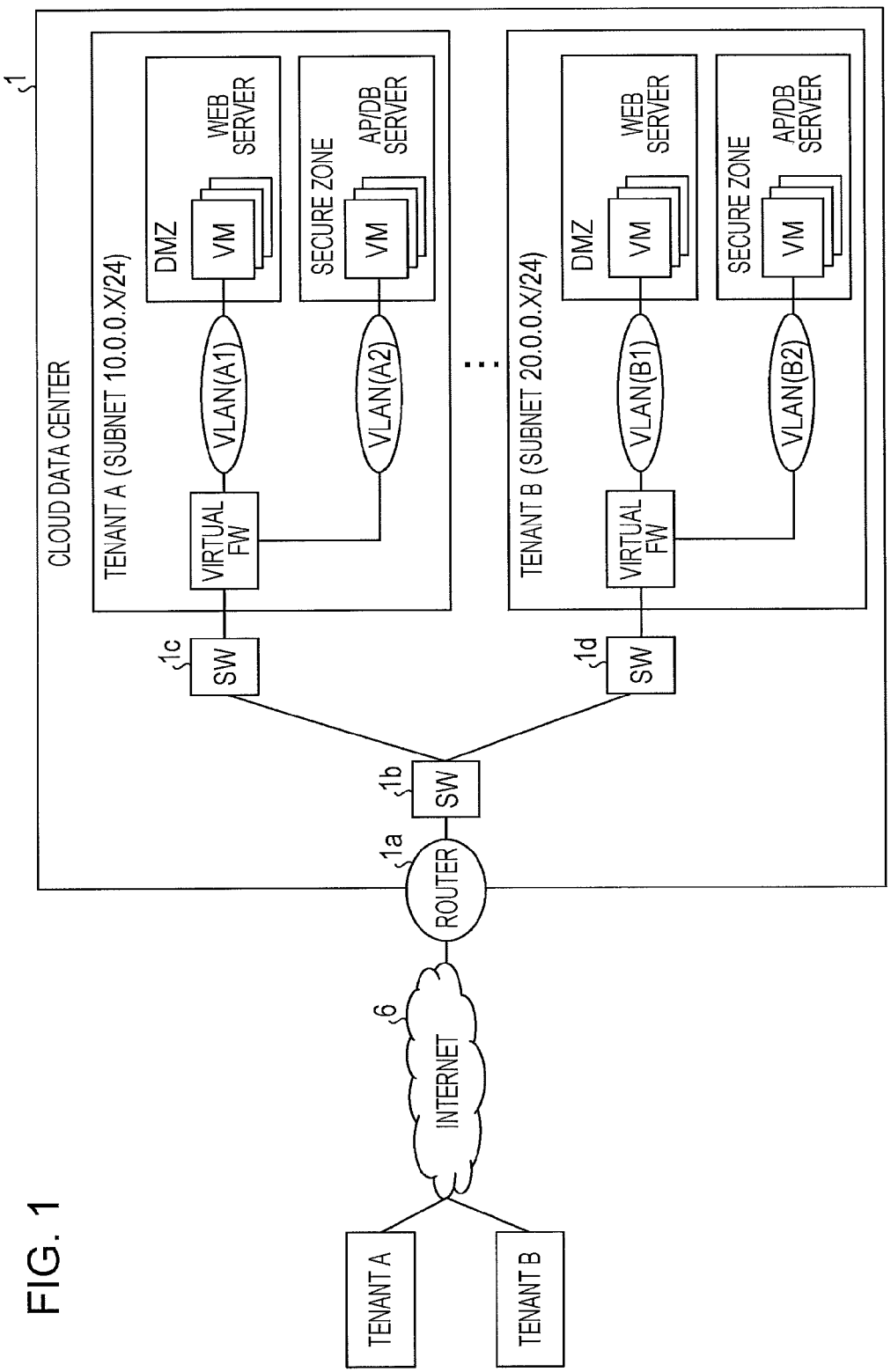
FIG. 1 is a diagram illustrating an example of an overall configuration of an ICT system using virtual machines, according to a first embodiment.

FIG. 1 is a diagram illustrating an example of an overall configuration of an ICT system using virtual machines, according to a first embodiment. The ICT system illustrated in FIG. 1 provides users with a VM-based platform configured using computing resources on a network.

As illustrated in FIG. 1, the platform provided by the ICT system according to the first embodiment is a multi-tenant environment including multiple tenants A and B representing groups, such as companies and departments. VMs for each tenant A or B belong to the same IP subnet. Each IP subnet is divided into network zones having different security policies.

In FIG. 1, a user terminal belonging to the tenant A uses a service by accessing a subnet for the tenant A, the subnet being included in a cloud data center 1, through an Internet 6. Similarly, a user terminal belonging to the tenant B uses a service by accessing a subnet for the tenant B, the subnet being included in the cloud data center 1, through the Internet 6.

The cloud data center 1 includes a router 1a, switches (SWs) 1b, 1c, and 1d, and physical servers. The physical servers operate VMs that execute functions of a web server, an AP server, and so on and are divided into subnets via switches and so on.

The subnet for the tenant A is a network identified with, for example, a network address "10.0.0.x/24" and is a system that a user in the tenant A has constructed using VMs. The subnet for the tenant A is divided through VLANs into a DMZ to which VMs that execute a web server belong and a secure zone to which VMs that execute an AP server and a DB server belong. Each virtual FW performs relay control on communication between the different VLANs.

For example, one virtual FW has an interface for a VLAN (A1) to which the DMZ belongs and an interface for a VLAN (A2) to which the secure zone belongs. The virtual FW relays or blocks communication from a VM in the DMZ to a VM in the secure zone or communication from a VM in the secure zone to a VM in the DMZ. The virtual FW also relays or blocks communication between a VM in the DMZ and an external network or communication between a VM in the secure zone and the external network.

The subnet for the tenant B is a network identified with, for example, a network address "20.0.0.x/24" and is a system that a user in the tenant B has constructed using VMs. In a manner similar to the tenant A, the subnet for the tenant B is divided through VLANs into a DMZ to which VMs that execute a web server belong and a secure zone to which VMs that execute an AP server and a DB server belong. Each virtual FW performs relay control on communication between the different VLANs.

For example, one virtual FW has an interface for a VLAN (B1) to which a DMZ belongs and an interface for a VLAN (B2) to which a secure zone belongs. The virtual FW relays or blocks communication from a VM in the DMZ to a VM in the secure zone or communication from a VM in the secure zone to a VM in the DMZ. The virtual FW also relays or blocks communication between a VM in the DMZ and an external network or communication between a VM in the secure zone and the external network.

In such an ICT system, access from a user terminal in the tenant A arrives at the router is in the cloud data center 1 through the Internet 6. The router is then identifies that the access is access to the subnet for the tenant A and routes the access to the switch is via the switch 1b. As a result, the user in the tenant A can access the web server or the like for the tenant A.

Similarly, access from a user terminal in the tenant B arrives at the router is in the cloud data center 1 through the Internet 6. The router is then identifies that the access is access to the subnet for the tenant B and routes the access to the switch 1*d* via the switch 1*b*. This allows the user in the tenant B to access the web server or the like for the tenant B.

[Physical Structure]

Figure 2:
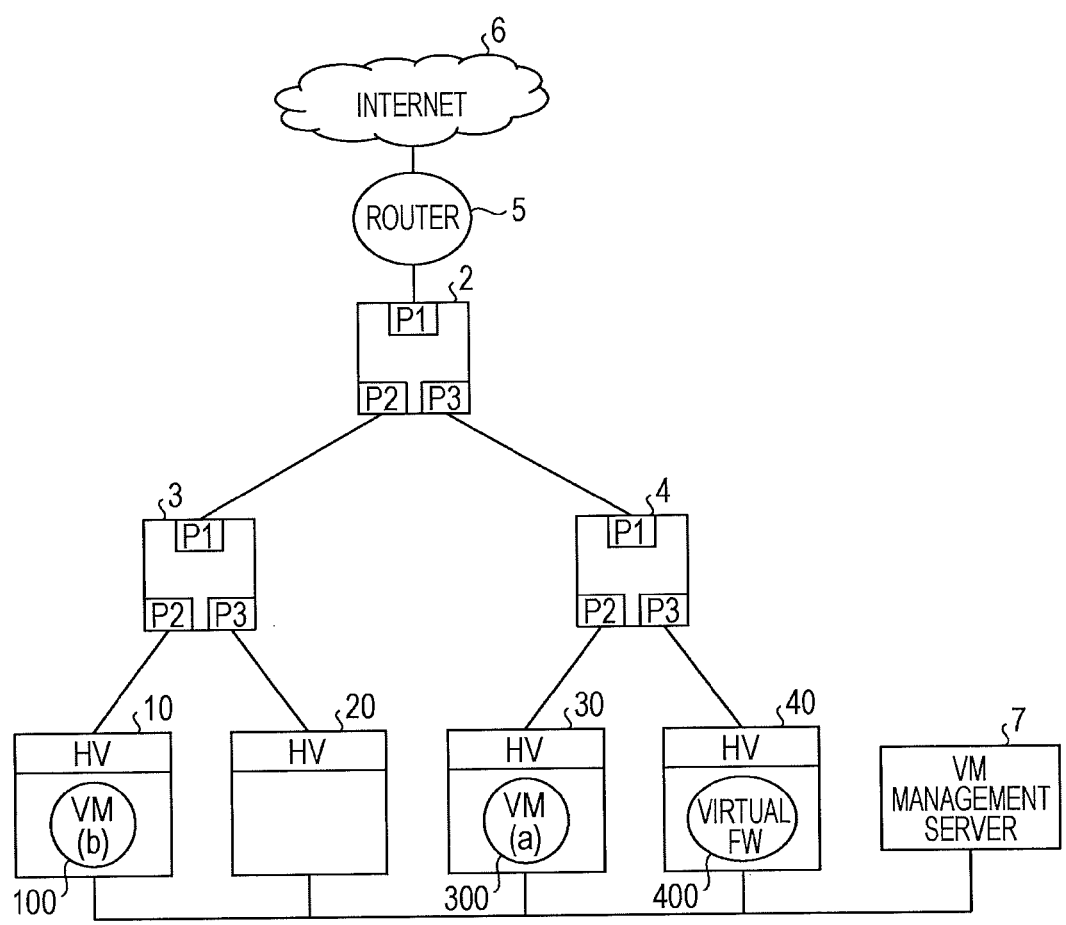
FIG. 2 is a diagram illustrating an example of physical connections in an ICT system, according to a first embodiment.

Next, a description will be given of the physical servers and the physical switches included in the cloud data center 1. FIG. 2 is a diagram illustrating an example of physical connections in an ICT system, according to a first embodiment. FIG. 2 is a schematic diagram of the cloud data center 1 in the multi-tenant environment illustrated in FIG. 1.

As illustrated in FIG. 2, the ICT system exemplified in the first embodiment includes L2 switches 2, 3, and 4, a router 5, physical servers 10, 20, 30, and 40, and a VM management server 7.

Each L2 switch 2, 3, or 4 is a network device that relays communication between a user terminal in each tenant and a VM through an Internet 6, communication between VMs, and so on. Each L2 switch outputs an input packet to a destination, based on an FDB.

In the example in FIG. 2, a port P1 of the L2 switch 2 is connected to the router 5, a port P2 of the L2 switch 2 is connected to a port P1 of the L2 switch 3, and a port P3 of the L2 switch 2 is connected to a port P1 of the L2 switch 4. The port P1 of the L2 switch 3 is connected to the port P2 of the L2 switch 2, a port P2 of the L2 switch 3 is connected to the physical server 10, a port P3 of the L2 switch 3 is connected to the physical server 20. The port P1 of the L2 switch 4 is connected to the port P3 of the L2 switch 2, a port P2 of the L2 switch 4 is connected to the physical server 30, and a port P3 of the L2 switch 4 is connected to the physical server 40.

The router 5 is a network device that relays access from outside of the ICT system to the L2 switch 2 and also relays access from inside of the ICT system to outside. The VM management server 7 is a server apparatus connected to the physical servers 10, 20, 30, and 40 to send a VM-migration start instruction or end notification thereto.

Each physical server 10, 20, 30, or 40 is a server apparatus that executes a hypervisor (hereinafter referred to as an "HV") so as to cause the HV to operate the VM. In the example in FIG. 2, a VM (b) 100 operates on the physical server 10, a VM (a) 300 operates on the physical server 30, and a virtual FW 400 operates on the physical server 40.

The VM (a) 300 and the VM (b) 100 are virtual machines that provide users with functions of a web server and a DB server, and belong to different networks. The virtual FW 400 is a virtual machine that provides a transparent firewall function that relays communication without terminating it, and belongs to both the network for the VM (a) 300 and the network for the VM (b) 100. For example, the virtual FW 400 stores therein relay rules for determining whether or not communication between the VM (a) 300 and the VM (b) 100 is to be relayed. Upon receiving a packet from the VM (a) 300, the virtual FW 400 filters the packet based on the relay rules.

[Logical Connections]

Figure 3:
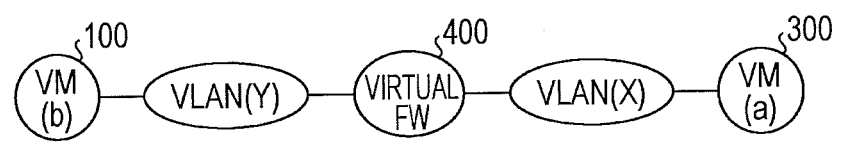
FIG. 3 is a diagram illustrating an example of logical connections in an ICT system, according to a first embodiment.

Next, a description will be given of logical connections in the system illustrated in FIG. 2. FIG. 3 is a diagram illustrating an example of logical connections in an ICT system, according to a first embodiment.

As illustrated in FIG. 3, a VM (a) 300 belongs to a VLAN (X), and a VM (b) 100 belongs to a VLAN (Y). The virtual FW 400 and the VM (a) 300 are connected to each other through the VLAN (X), and the virtual FW 400 and the VM (b) 100 are connected to each other through the VLAN (Y). Thus, a packet sent from the VM (a) 300 to the VM (b) 100 first arrives at the virtual FW 400. Based on the relay rule, the virtual FW 400 relays the packet, which has been sent from the VM (a) 300 to the VM (b) 100, to the VM (b) 100. The VLAN (X) is identified with VLAN-ID=X.

More specifically, in FIG. 2, a packet that has been sent from the VM (a) 300 to the VM (b) 100, is input to the port P2 of the L2 switch 4. Based on the FDB, the L2 switch 4 outputs the packet input to the port P2, via the port P3. The packet arrives at the virtual FW 400 on the physical server 40.

The virtual FW 400 identifies that the packet is to be relayed, based on the relay rule, and sends back the packet received from the L2 switch 4, to the L2 switch 4. Based on the FDB, the L2 switch 4 outputs the packet input to the port P3, via the port P1. Based on the FDB, the L2 switch 2 then outputs the packet input to the port P3, via the port P2. Based on the FDB, the L2 switch 3 outputs the packet input to the port P1, via the port P2. The VM (b) 100 receives the packet sent from the VM (a) 300, as described above.

As described above, each of the L2 switches 2, 3, and 4 stores, in the FDB thereof, information on a path through which a packet having the destination "VM (a) 300" or "VM (b) 100" is to be transferred via the L2 switch 4. The L2 switch 4 stores, in the FDB thereof, information on a path through which a packet having the destination "VM (a) 300" or "VM (b) 100" is to be transferred with being first output via the port P3 and arriving at the virtual FW 400.

In this configuration, it is assumed that the virtual FW 400 is migrated from the physical server 40 to the physical server 20 in response to an instruction from the VM management server 7. Upon the migration, the HV in the migration-destination physical server 20 broadcasts a GARP packet including VLAN-ID=X and a MAC address and IP address of the virtual FW 400. Similarly, the HV in the migration-destination physical server 20 broadcasts a GARP packet including VLAN-ID=Y and the MAC address and IP address of the virtual FW 400.

As a result, each L2 switch rewrites, in the FDB thereof, information on the port to which a packet having the destination "virtual FW 400" is to be output to information on the port to which the physical server 20 is connected. This allows the packet sent from each VM or the like to the virtual FW 400, to arrive at the virtual FW 400 that operates on the physical server 20.

In addition, when, in response to request for migration of processing for relaying communication between first and second nodes, the migration is completed, the virtual FW 400 generates control information indicating that communication from the second node to the first node is to be performed via the migration destination. The virtual FW 400 sends the generated control information to the multiple L2 switches. For example, the virtual FW 400 generates FDB-rewriting GARP packets including destination information and source information of a packet that has been relayed or blocked on the physical server before the migration. The virtual FW 400 then broadcasts the generated FDB-rewriting GARP packets. As a result, each L2 switch 2, 3, or 4 becomes able to learn the relay path after the migration, thereby allowing the virtual FW 400 to continue relaying even after it is migrated.

[Configuration of Physical Server]

Next, a description will be given of a functional configuration of the physical servers illustrated in FIG. 2. Since the physical servers have the same or similar configurations, a description below will be given of the physical server 40 by way of example. Since the L2 switches 2, 3, and 4 and the router 5 illustrated in FIG. 2 have configurations that are the same as or similar to those of typical switches and a typical router, detailed descriptions thereof are not given hereinafter.

FIG. 4 is a diagram illustrating a layer structure of a physical server, according to an embodiment. In FIG. 4 illustrates the physical server 40. Basically, the other physical servers 10 to 30 also have substantially the same or similar configurations. As illustrated in FIG. 4, the physical server 40 includes hardware 41, an OS 42, an HV 43, VMs 44, OSs 45, a virtual FW 400, and application programs 46. The OS 42, the HV 43, and the VMs 44 are software executed by the hardware 41 in the physical server 40.

The configuration of the hardware 41 is described later. The OS 42 is an operating system that controls the hardware 41. The HV 43 is a hypervisor program executed on the OS 42.

The VMs 44 are virtual machine programs generated and managed by the HV 43. The OSs 45, the virtual FW 400, and the application programs 46 are software executed by the VMs 44. The HV 43 manages various types of processing for the VMs 44.

For example, the HV 43 allocates a virtual memory and a virtual processor to the VMs 44. The HV 43 is configured to operate the multiple VMs 44.

The OSs 45 are operating systems executed on the corresponding VMs 44. The virtual FW 400 is a firewall program executed by the corresponding VM 44. The VMs 44 are configured to also execute the application programs 46 other than the firewall program. In addition, multiple virtual FWs 400 and multiple application programs 46 may be executed on one OS 45.

Upon receiving a migration start instruction from the VM management server 7, the HV 43 executes migration of the corresponding VM 44. For example, the HV 43 executes memory copy for copying the contents of the virtual memory in the VM 44 in the migration-source physical server to a new VM 44 to construct a configuration that is the same as or similar to that of the VM 44 of the migration-source physical server. When the memory copy is completed, the HV 43 operates the newly generated VM 44. In such a manner, the HV 43 executes the migration of the VM.

When the migration is completed, the HV 43 broadcasts a GARP packet regarding the migrated VM 44. More specifically, the HV 43 broadcasts a GARP packet including the VLAN-ID to which the migrated VM 44 belongs and the MAC address and IP address of the migrated VM 44.

Figure 5:
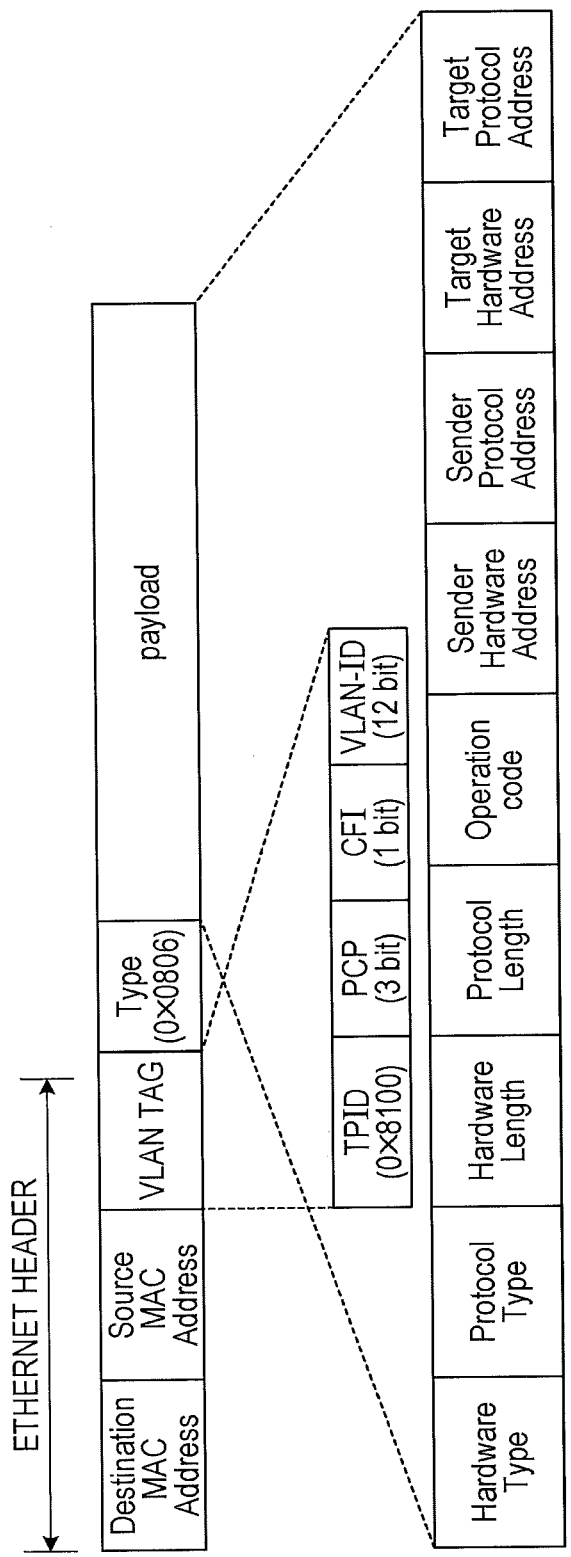
FIG. 5 is a diagram illustrating an example of a format of a GARP packet, according to an embodiment.

Now, a description will be given of an example of the format of the GARP packet. FIG. 5 is a diagram illustrating an example of a format of a GARP packet, according to an embodiment. As illustrated in FIG. 5, the packet format of a GARP packet includes an Ethernet (registered trademark) header, a "type" field, and a "payload" field.

The Ethernet (registered trademark) header includes a "destination MAC address" field, a "source MAC address" field, and a "VLAN tag" field. The "destination MAC address" field is a field that identifies the destination of the GARP packet. In the "destination MAC address" field, for example, a broadcast address, such as "FF:FF:FF:FF:FF:FF" is set. The "source MAC address" field is a field that identifies the source of the GARP packet. In the above-described example, the MAC address of the migration-source physical server 20 is set in the "source MAC address" field. The "VLAN tag" field is a field for identifying a VLAN and includes a "tag protocol identifier (TPID)" field, a "priority code point (PCP)" field, a "canonical format indicator (CFI)" field, and a "VLAN-ID" field.

The "TPID" field is a 16-bit field that indicates that a corresponding frame is a frame to which a VLAN tag is added. In the "TPID" field, for example, a fixed value "0x8100" is set. The "PCP" field is a 3-bit field indicating priority. In the "PCP" field, for example, a fixed value "0x0" is set. The "CFI" field is a 1-bit field indicating whether or not this format is a regular format. For example, For Ethernet (registered trademark), a fixed value "0x0" is set in the "CFI" field. The "VLAN-ID" field is a 12-bit field that identifies a VLAN to which the sent GARP packet belongs. For example, the VLAN-ID of a migrated VM is set in the "VLAN-ID" field.

The "type" field is a field that indicates that this packet is an ARP packet. For example, a fixed value "0x0806" is set in the "type" field. The "payload" field includes fields for a hardware type, a protocol type, a hardware length, a protocol length, an operation code, a sender hardware address, a sender protocol address, a target hardware address, and a target protocol address.

The "hardware type" field is a 2-byte field. For example, for Ethernet (registered trademark), a fixed value "0x1" is set in the "hardware type" field. The "protocol type" field is a 2-byte field. For example, for an IP network, a fixed value "0x0800" is set in the "protocol type" field. The "hardware length" field is a field that designates the length of a MAC address. For example, a fixed value "6" is set in the "hardware length" field. The "protocol length" field is a field that designates the length of an IP address. For example, a fixed value "4" is set in the "protocol length" field. The "operation code" field is a 1-byte field that designates whether this packet is for an ARP request or a response to an ARP request. For example, for an ARP request, a fixed value "1" is set in the "operation code" field. The "sender hardware address" field is a field that designates the MAC address of a VM for which an ARP request is sent. The "sender protocol address" field is a field that designates the IP address of a VM for which an ARP request is sent. In the "target hardware address" field, information that is the same as that in the "sender hardware address" field is set. In the "target protocol address" field, information that is the same as that in the "sender protocol address" field is set.

Now, as one example, suppose a case in which the virtual FW 400 has been migrated to the physical server 20. In this case, the HV 43 in the physical server 20 sends a GARP packet for each of the VLAN (X) and the VLAN (Y).

More specifically, the HV 43 sets, in the "VLAN-ID" field in the "VLAN tag" field, "X" that identifies the VLAN (X). In addition, the HV 43 sets the "MAC address" of the virtual FW 400 in the "sender hardware address" field and the "target hardware address" field and sets the IP address of the virtual FW 400 in the "sender protocol address" and the "target protocol address" field. Thereafter, the HV 43 broadcasts, to the L2 switches, a GARP packet in which those pieces of information are set.

Similarly, the HV 43 in the physical server 20 sets, in the "VLAN-ID" field in the "VLAN tag" field, "Y" that identifies the VLAN (Y). In addition, the HV 43 sets the MAC address of the virtual FW 400 in the "sender hardware address" field and the "target hardware address" field and sets the IP address of the virtual FW 400 in the "sender protocol address" field and the "target protocol address" field. Thereafter, the HV 43 broadcasts, to the L2 switches, a GARP packet in which those pieces of information are set.

Upon receiving the GARP packets, each L2 switch rewrites the port number that is associated with the MAC address of the virtual FW 400 in the FDB, to the port number via which the GARP packets were received. As a result, even after the virtual FW 400 has been migrated to another physical server, each L2 switch is able to properly relay a packet addressed to the virtual FW 400.

[Configuration of Virtual FW]

Figure 6:
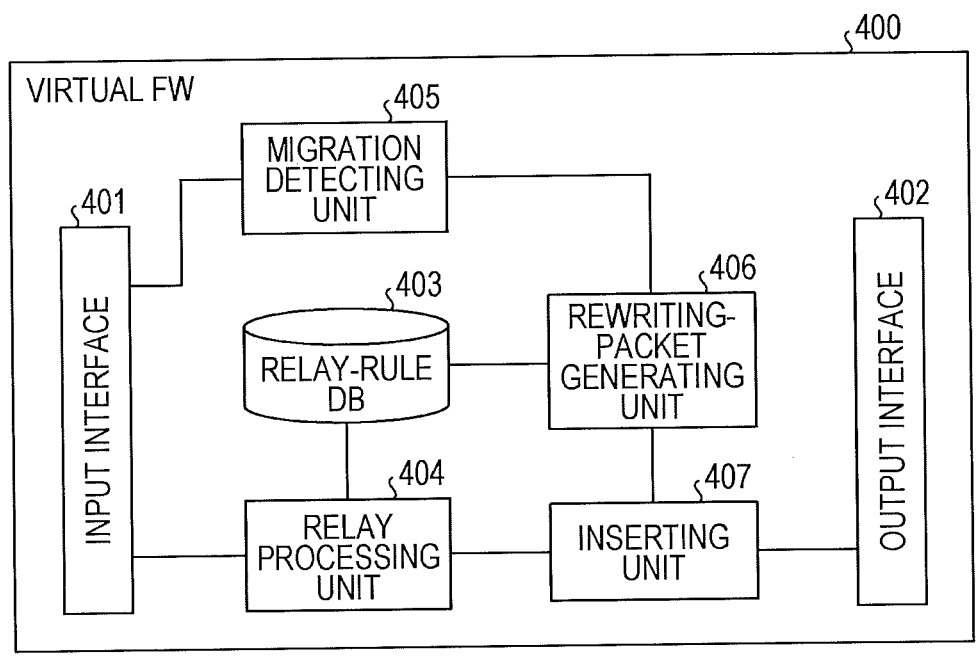
FIG. 6 is a diagram illustrating a configuration example of a virtual FW, according to an embodiment.

Next, a description will be given of the functional configuration of the virtual FW 400. Since other VMs also have configurations that are the same as or similar to those of typical VMs, detailed descriptions thereof are not given hereinafter. FIG. 6 is a diagram illustrating a configuration example of a virtual FW, according to an embodiment.

The virtual FW 400 is a transparent firewall program that relays communication between VMs without terminating it. As illustrated in FIG. 6, the virtual FW 400 includes an input interface 401, an output interface 402, a relay-rule DB 403, a relay processing unit 404, a migration detecting unit 405, a rewriting-packet generating unit 406, and an inserting unit 407. Those processing units are realized by the virtual processor implemented by the VM 44.

The input interface 401 is a processing unit that receives a packet arriving at the virtual FW 400 and outputs the received packet to the relay processing unit 404 or the migration detecting unit 405. For example, the input interface 401 receives, as packets to be relay-controlled, a packet addressed to a VM, a packet addressed to the virtual FW 400, and various notifications sent from the VM management server 7.

The output interface 402 is a processing unit that sends a packet arriving at the virtual FW 400 to a destination. For example, the output interface 402 sends, to a destination, a packet to be relayed, and broadcasts FDB-rewriting GARP packets generated by the rewriting-packet generating unit 406.

The relay-rule DB 403 stores therein relay rules for relaying or blocking performed by the firewall function. The relay-rule DB 403 is stored in the virtual memory. FIG. 7 is a diagram illustrating an example of information stored in a relay-rule DB, according to an embodiment. As illustrated in FIG. 7, the relay-rule DB 403 stores therein first VM information, second VM information, and actions in association with each other.

The first VM information and the second VM information are information regarding VMs between which communication is to be relayed and each action is information indicating an operation as to whether or not a packet is to be relayed or blocked. That is, the relay-rule DB 403 stores therein relay rules that specify whether or not communication between a VM identified with the first VM information and a VM identified with the second VM information is to be relayed or blocked.

As each of the first VM information and the second VM information, an IP address, a MAC address, and a VLAN-ID are stored in association with each other. The IP address represents an IP address set for the VM to be relay-controlled, and the MAC address represents a MAC address set for the VM to be relay-controlled. The VLAN-ID represents the ID of a VLAN to which the VM to be relay-controlled belongs. The action is information indicating whether or not a packet is to be relayed or blocked. "Pass" is set for relaying the packet, and "discard" is set for blocking the packet.

A description will be given of one example of the information illustrated in FIG. 7. The information illustrated in FIG. 7 indicates that communication between a VM that belongs to the VLAN (X) and that has an IP address "10.0.0.3" and a MAC address "11:22:33:44:55:0a" and a VM that belongs to the VLAN (Y) and that has an IP address "10.0.0.2" and a MAC address "11:22:33:44:55:0b" is to be relayed.

The relay processing unit 404 is a processing unit that controls a packet that arrives at the input interface 401, based on the relay-rule DB 403. For example, the relay processing unit 404 filters a packet that arrives at the input interface 401.

For example, the relay processing unit 404 extracts, from the arrived packet, the MAC address, the IP address, and the VLAN-ID of a source VM. Similarly, the relay processing unit 404 extracts, from the arrived packet, the MAC address, the IP address, and the VLAN-ID of a destination VM. The relay processing unit 404 then identifies, from the relay-rule DB 403, the action corresponding to the extracted set of the MAC addresses, the IP addresses, and the VLAN-IDs, and executes processing corresponding to the identified action.

When the identified action is "pass", the relay processing unit 404 sends the arrived packet to the destination via the inserting unit 407 and the output interface 402. On the other hand, when the identified action is "discard", the relay processing unit 404 discards the arrived packet.

The migration detecting unit 405 is a processing unit that detects, from packets that arrive at the input interface 401, a packet indicating that the migration of the corresponding VM to another physical server is completed. That is, the migration detecting unit 405 detects a migration completion event sent from the VM management server 7 or the HV in the migration-destination physical server. Upon detecting a migration completion event, the migration detecting unit 405 notifies the rewriting-packet generating unit 406 that the migration is completed.

The rewriting-packet generating unit 406 is a processing unit that generates, when the migration is completed, FDB-rewriting GARP packets that are different from the GARP packets sent by the HV. For example, with respect to the VMs between which communication is to be relayed and whose information is stored in the relay-rule DB 403, the rewriting-packet generating unit 406 generates FDB-rewriting GARP packets and outputs the generated FDB-rewriting GARP packets to the inserting unit 407.

The FDB-rewriting GARP packet is a packet for requesting a L2 switch to rewrite a port number that is associated, in the FDB thereof, with the VMs between which communication is to be relayed, from the number of the port connected to the migration-source physical server to the number of the port connected to the migration-destination physical server.

Figure 8:
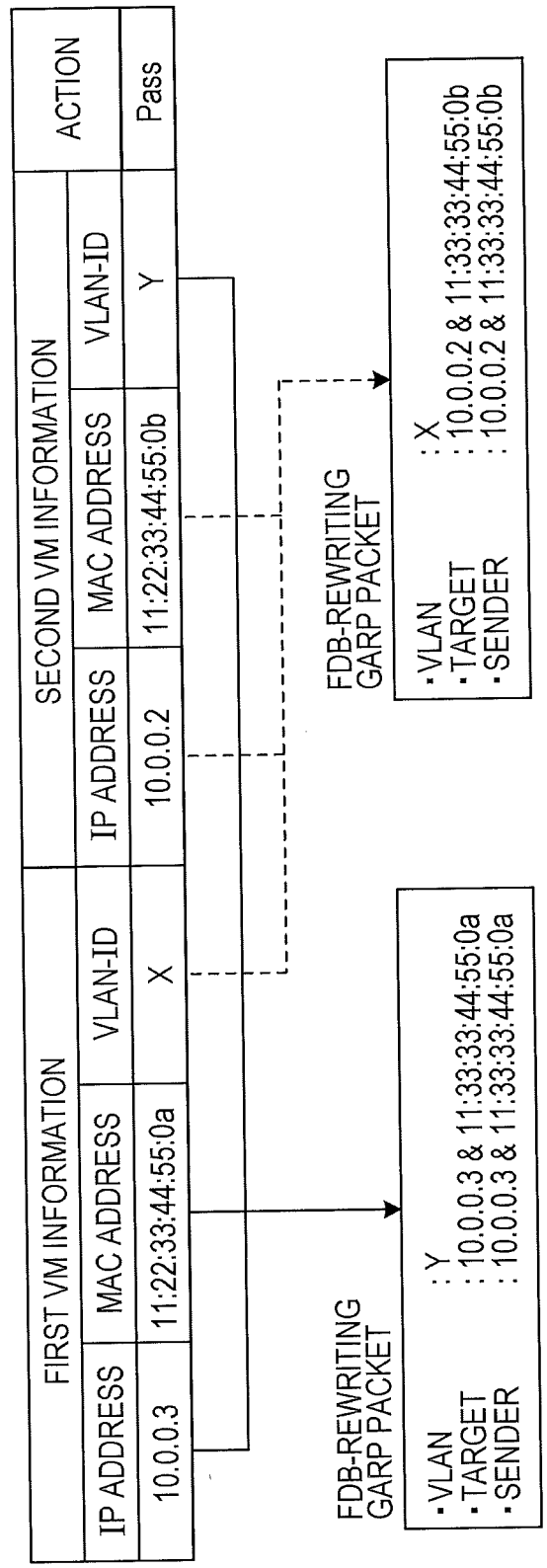
FIG. 8 is a diagram illustrating an example of generation of an FDB-rewriting GARP packet, according to an embodiment.

Now, generation of FDB-rewriting GARP packets will be specifically described. FIG. 8 is a diagram illustrating an example of generation of an FDB-rewriting GARP packet, according to an embodiment. As illustrated in FIG. 8, the rewriting-packet generating unit 406 extracts the "IP address=10.0.0.3" and the "MAC address=11:22:33:44:55:0a" from the first VM information in the relay-rule DB 403 and also extracts the "VLAN-ID=Y" from the second VM information.

The rewriting-packet generating unit 406 sets the extracted first-VM-information MAC address "11:22:33:44:55:0a" to the "sender hardware address" field and the "target hardware address" field in a GARP packet. The rewriting-packet generating unit 406 also sets the extracted first-VM-information IP address "10.0.0.3" to the "sender protocol address" field and the "target protocol address" field. In addition, the rewriting-packet generating unit 406 sets the extracted second-VM-information VLAN-ID "Y" to the "VLAN-ID" field. The rewriting-packet generating unit 406 then sets a broadcast address to the "destination MAC Address" field and sets the MAC address of the migration-destination physical server to the "source MAC address"

field. As described above, the rewriting-packet generating unit 406 generates an FDB-rewriting GARP packet corresponding to the first VM information.

Similarly, the rewriting-packet generating unit 406 extracts the "IP address=10.0.0.2" and the "MAC address=11:22:33:44:55:0b" from the second VM information in the relay-rule DB 403 and also extracts "VLAN-ID=X" from the first VM information.

The rewriting-packet generating unit 406 then sets the extracted second-VM-information MAC address "11:22:33: 44:55:0b" to the "sender hardware address" field and the "target hardware address" field in a GARP packet. The rewriting-packet generating unit 406 also sets the extracted second-VM-information IP address "10.0.0.2" to the "sender protocol address" field and the "target protocol address" field. In addition, the rewriting-packet generating unit 406 sets the extracted first-VM-information VLAN-ID "X" to the "VLAN-ID" field. The rewriting-packet generating unit 406 then sets a broadcast address to the "destination MAC address" field and sets the MAC address of the migration-destination physical server to the "source MAC address" field. The rewriting-packet generating unit 406 generates an FDB-rewriting GARP packet corresponding to the second VM information, as described above.

The inserting unit 407 is a processing unit that outputs, via the output interface 402, each FDB-rewriting GARP packet input from the rewriting-packet generating unit 406. As a result, each FDB-rewriting GARP packet is broadcast.

[Flow of Processing]

Next, a description will be given of processing executed when the virtual FW 400 is migrated. Now, a description will be given of an overall flow of migration of the virtual FW 400 and processing executed by the virtual FW 400 after the migration.

(Sequence Diagram)

Figure 9:
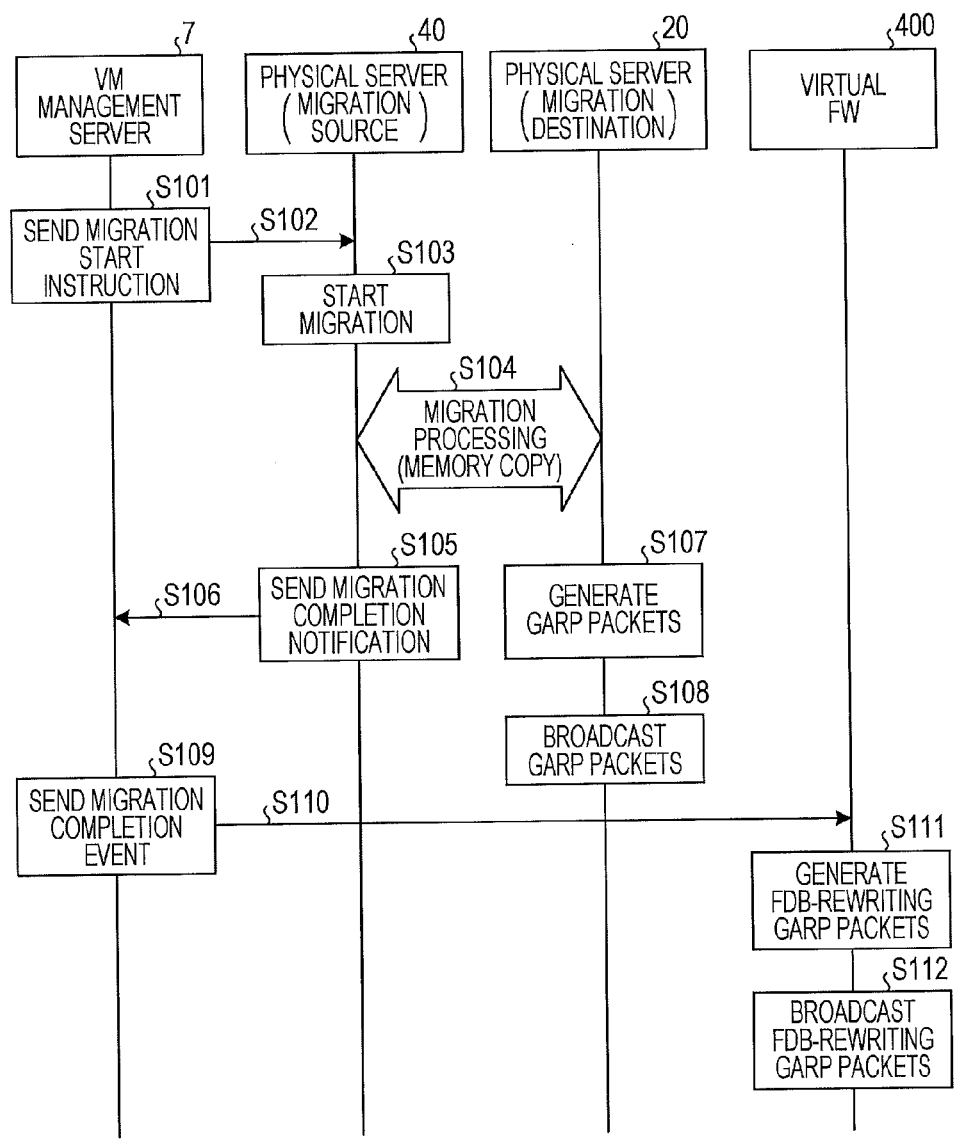
FIG. 9 is a diagram illustrating an example of an operational sequence for migration of a virtual FW, according to a first embodiment.

FIG. 9 is a diagram illustrating an example of an operational sequence for migration of a virtual FW, according to a first embodiment. As illustrated in FIG. 9, the VM management server 7 sends a migration start instruction to the migration-source physical server 40 on which the virtual FW 400 operates (in S101 and S102).

Upon receiving the migration start instruction, the HV 43 in the migration-source physical server 40 starts migration of the virtual FW 400 (in S103) and executes migration processing with the migration-destination physical server 20 (in S104). One example of the migration processing is memory copy or the like.

Thereafter, when the migration is completed, the HV 43 in the migration-source physical server 40 sends a migration completion notification to the VM management server 7 (in S105 and S106).

When the migration is completed, the HV 43 in the migration-destination physical server 20, on the other hand, generates GARP packets for the migrated virtual FW 400 (in S107) and broadcasts the generated GARP packets (in S108).

Upon receiving the migration completion notification, the VM management server 7 sends a migration completion event to the migrated virtual FW 400 (in S109 and S110).

When the migration detecting unit 405 in the virtual FW 400 detects the migration completion event, the rewriting-packet generating unit 406 generates FDB-rewriting GARP packets based on the corresponding relay rule (S111). Thereafter, the inserting unit 407 broadcasts the FDB-rewriting GARP packets generated in S111 (S112).

(Flowchart)

Figure 10:
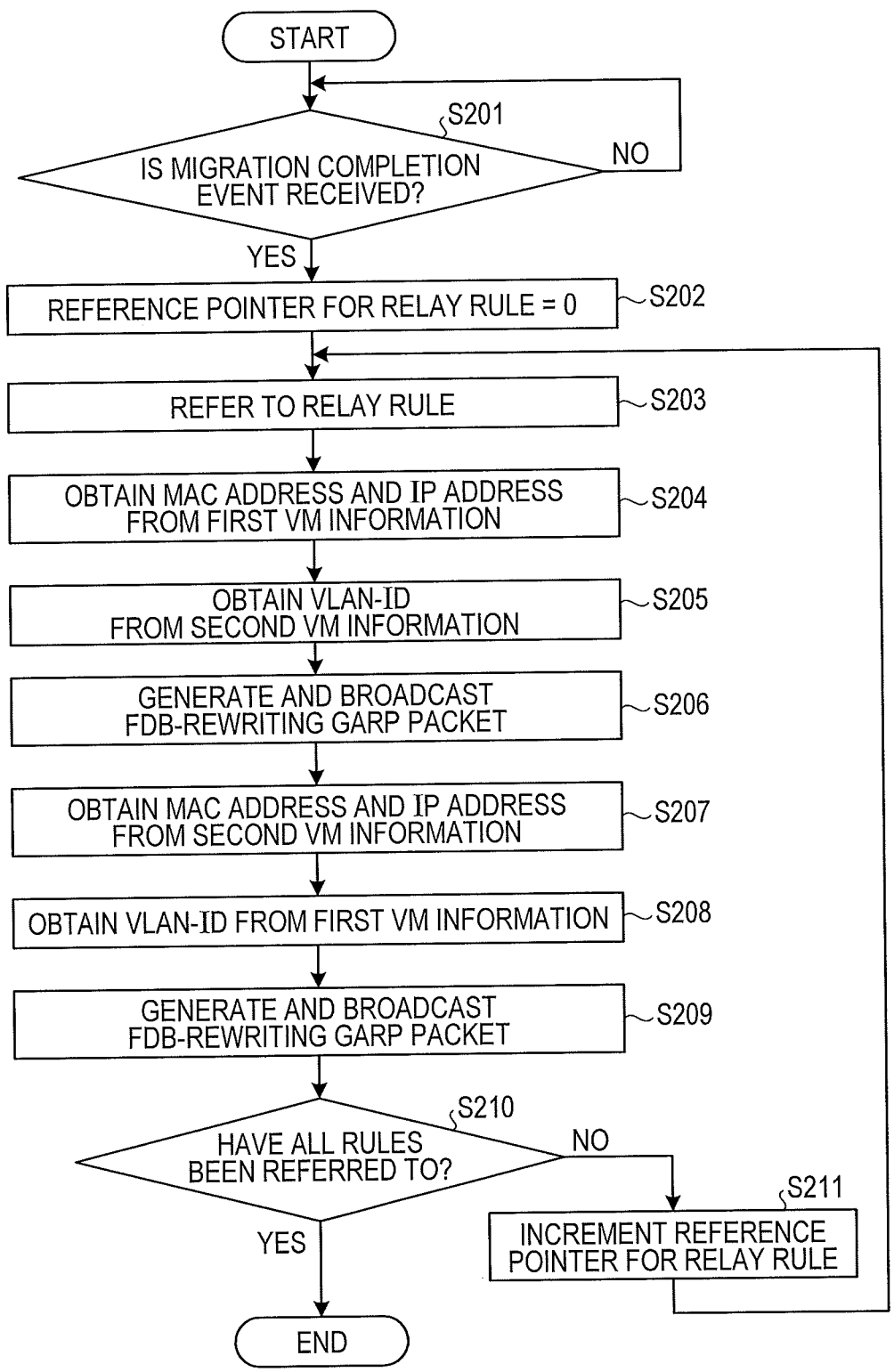
FIG. 10 is a diagram illustrating an example of an operational flowchart for processing executed by a virtual FW, according to a first embodiment.

FIG. 10 is a diagram illustrating an example of an operational flowchart for processing executed by a virtual FW, according to a first embodiment. As illustrated in FIG. 10, when the migration detecting unit 405 in the migrated virtual FW 400 receives a migration completion event (YES in S201), the rewriting-packet generating unit 406 sets a reference pointer for referring to the relay rule at 0 (in S202).

Subsequently, the rewriting-packet generating unit 406 refers to, of the relay rules stored in the relay-rule DB 403, the relay rule corresponding to the current reference pointer (in S203) to obtain the MAC address and the IP address from the first VM information (in S204). In addition, the rewriting-packet generating unit 406 obtains the VLAN-ID from the second VM information (in S205).

The rewriting-packet generating unit 406 then generates an FDB-rewriting GARP packet and broadcasts the FDB-rewriting GARP packet to the L2 switches (in S206). That is, the rewriting-packet generating unit 406 generates an FDB-rewriting GARP packet whose payload contains the MAC address and the IP address obtained in S204 from the first VM information, and whose header contains the VLAN-ID obtained in S205 from the second VM information, and then transmits the generated FDB-rewriting GARP packet.

Similarly, the rewriting-packet generating unit 406 refers to, of the relay rules stored in the relay-rule DB 403, a relay rule corresponding to the current pointer to obtain a MAC address and an IP address from the second VM information (in S207). In addition, the rewriting-packet generating unit 406 obtains the VLAN-ID from the first VM information (in S208).

The rewriting-packet generating unit 406 then generates an FDB-rewriting GARP packet and broadcasts the generated FDB-rewriting GARP packet to the L2 switches (in S209). That is, the rewriting-packet generating unit 406 generates an FDB-rewriting GARP packet whose payload contains the MAC address and the IP address that have been obtained in S207 from the second VM information, and whose header contains the VLAN-ID that has been obtained in S208 from the first VM information, and then sends the generated FDB-rewriting GARP packet.

Thereafter, the rewriting-packet generating unit 406 determines whether all relay rules have been referred to (in S210). When any relay rule that has not been referred to exists (NO in S210), the rewriting-packet generating unit 406 increments the reference pointer (in S211) to repeat the process in S203 and the subsequent processes. On the other hand, when a relay rule that has not been referred to does not exist (YES in S210), the rewriting-packet generating unit 406 ends the processing.

Specific Example

Figure 11:
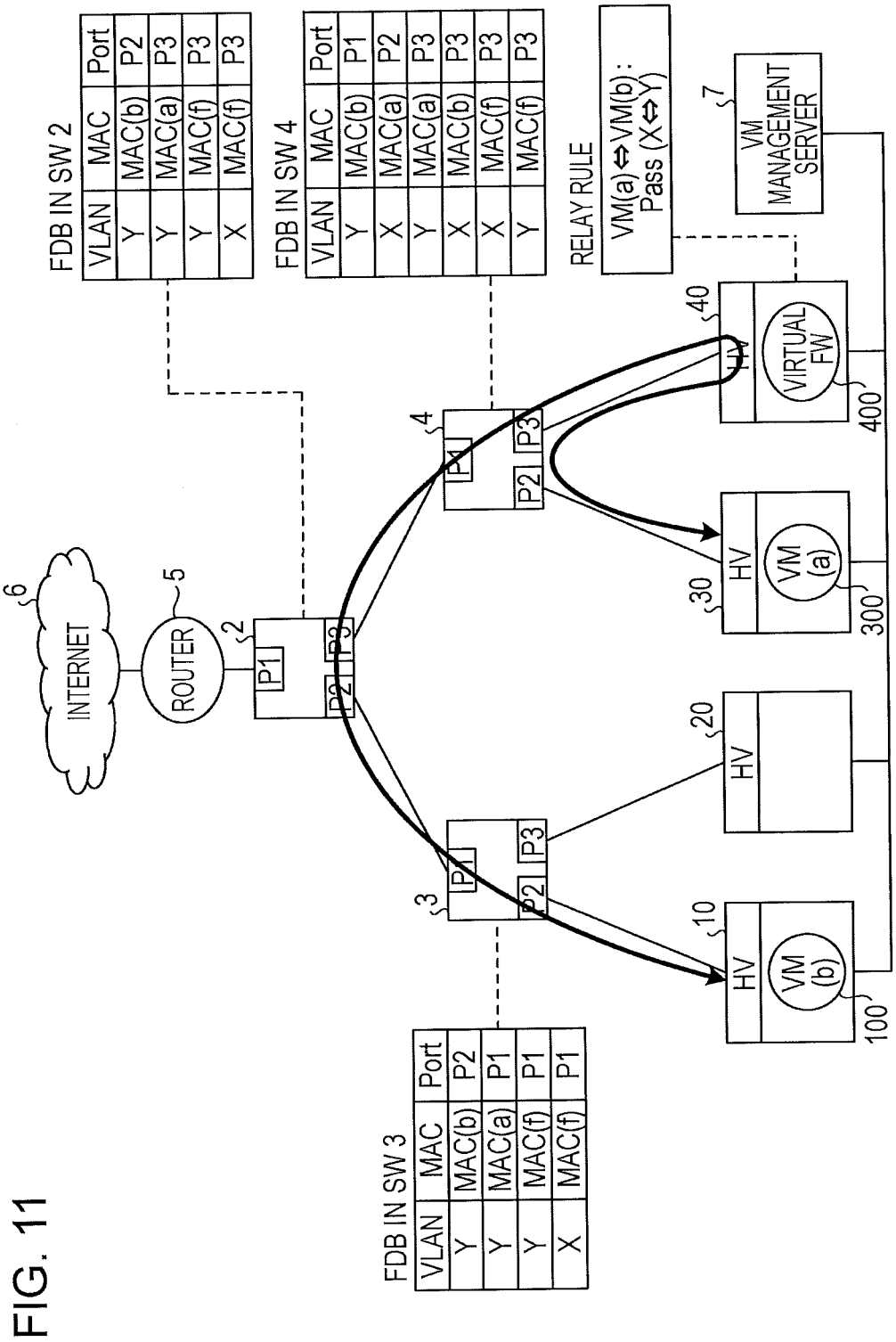
FIG. 11 is a schematic diagram illustrating an example of a transfer state before a virtual FW is migrated, according to an embodiment.
Figure 12:
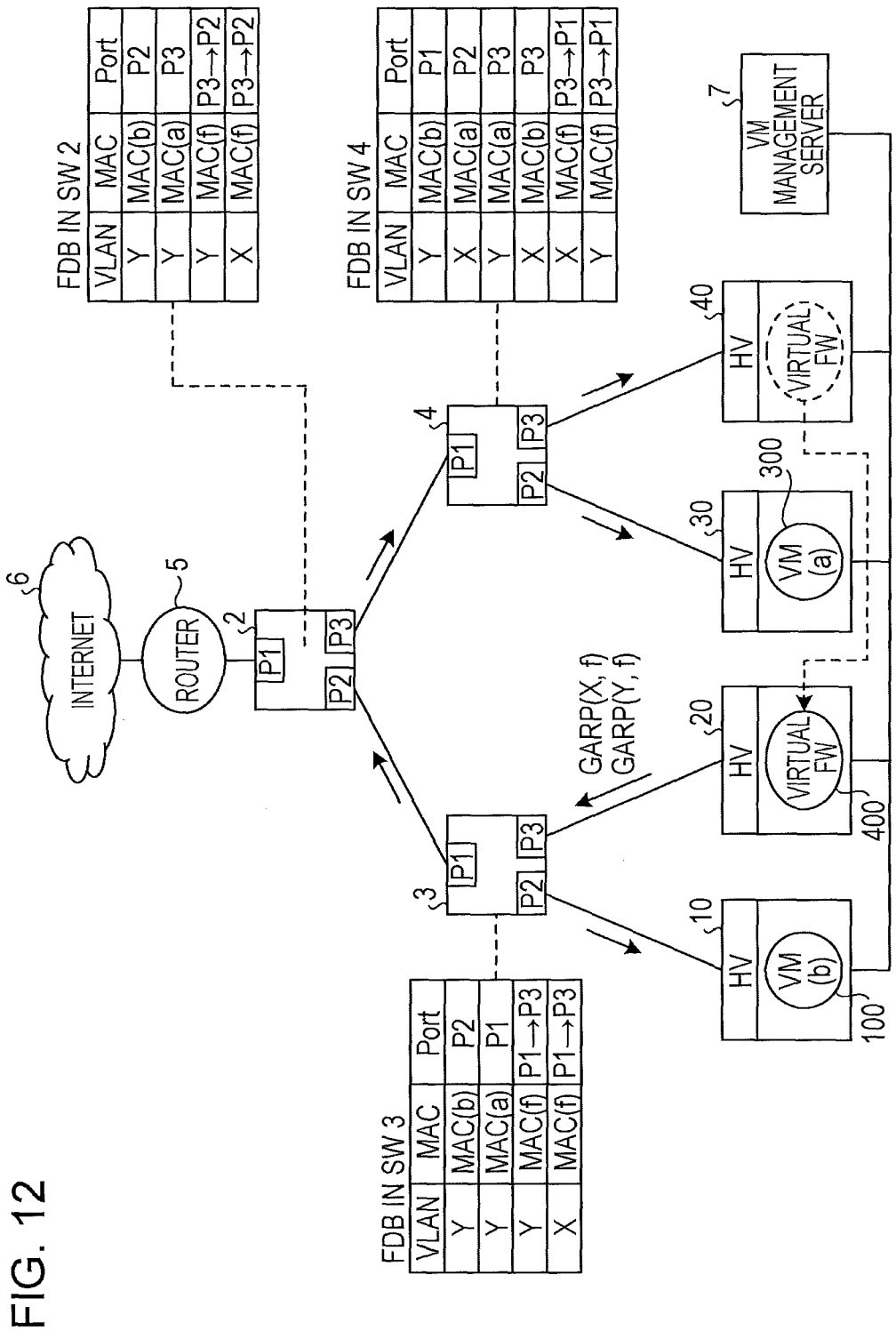
FIG. 12 is a schematic diagram illustrating an example of a transfer state after a virtual FW is migrated, according to an embodiment.
Figure 13:
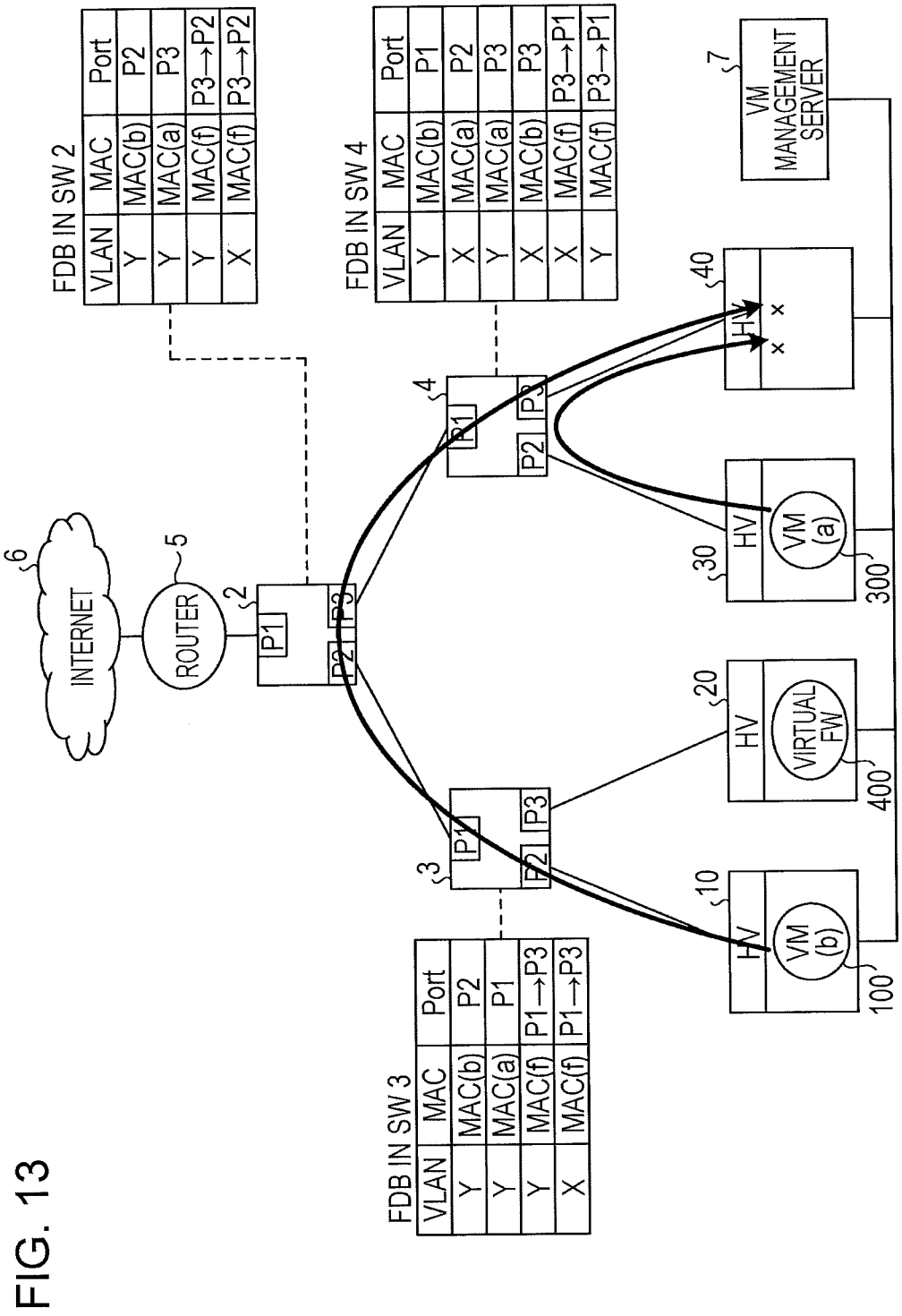
FIG. 13 is a schematic diagram illustrating an example of a state of communication disconnection after a virtual FW is migrated, according to an embodiment.
Figure 14:
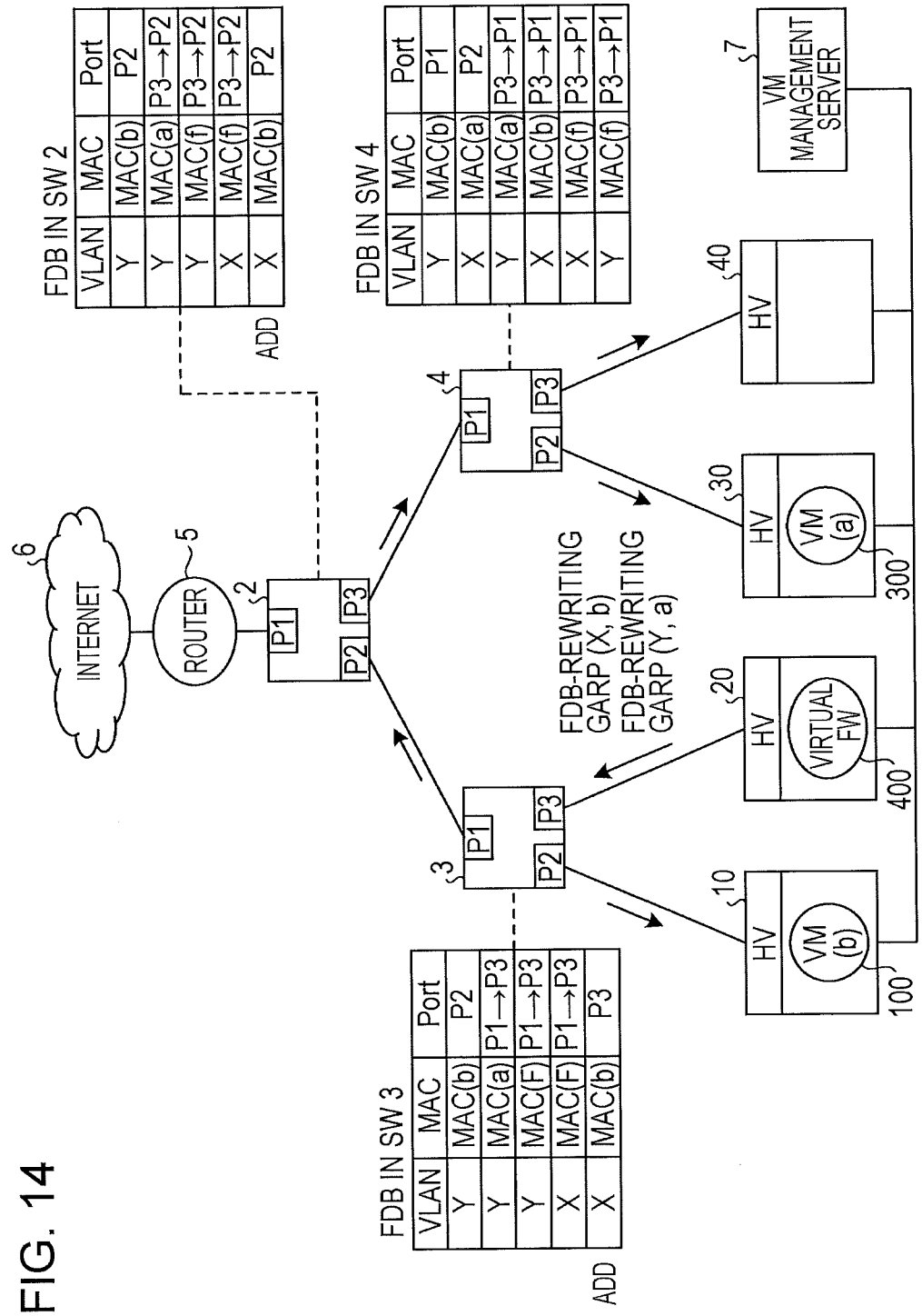
FIG. 14 is a schematic diagram illustrating an example of FDB update performed by a migrated virtual FW, according to an embodiment.
Figure 15:
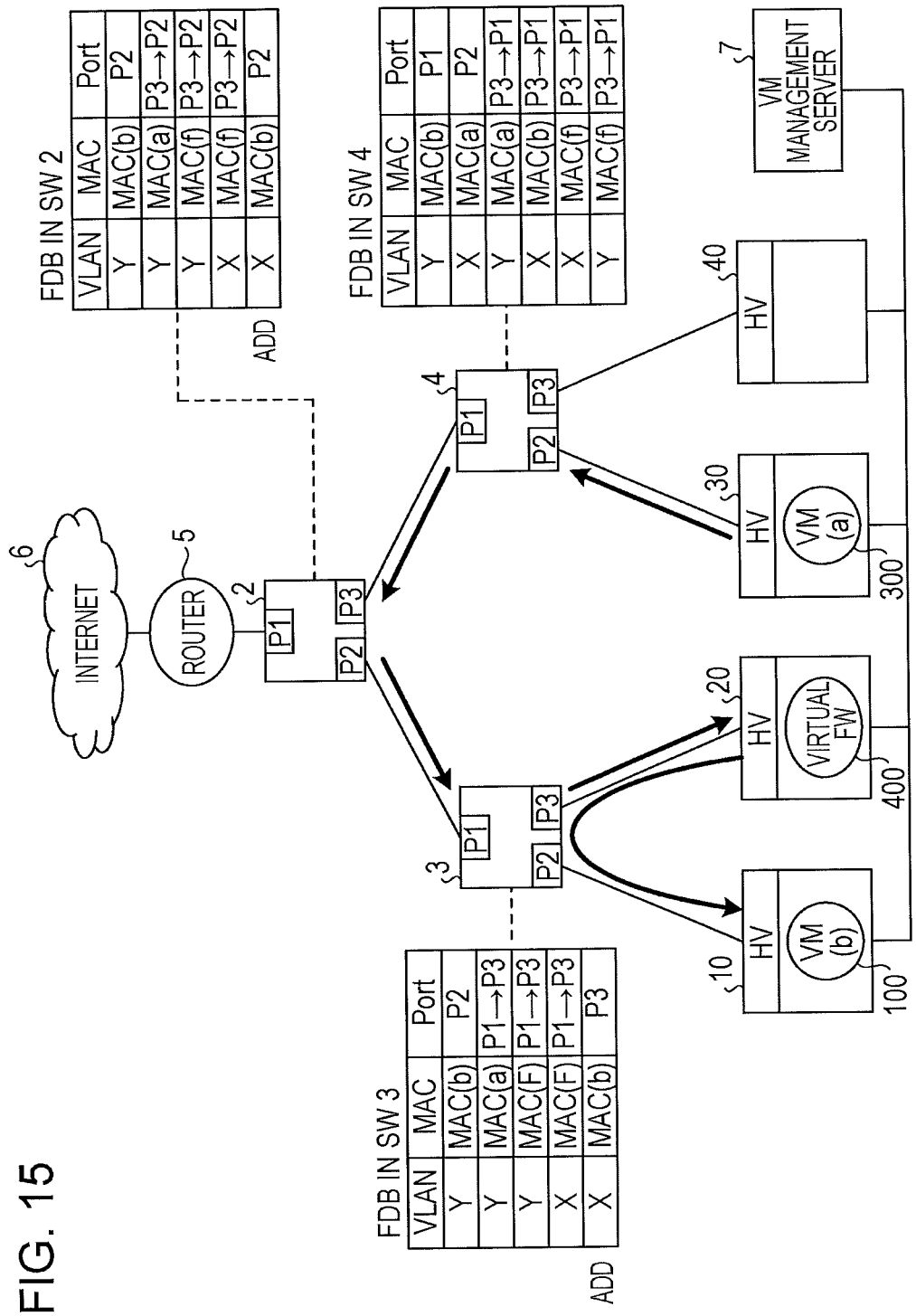
FIG. 15 is a schematic diagram illustrating an example of a state in which communication continues even after a virtual FW is migrated, according to an embodiment.

Next, an example of processing executed when the virtual FW 400 is migrated will be specifically described with reference to FIGS. 11 to 15. FIG. 11 is a schematic diagram illustrating an example of a transfer state before a virtual FW is migrated, according to an embodiment. FIG. 12 is a schematic diagram illustrating an example of a transfer state after a virtual FW is migrated, according to an embodiment. FIG. 13 is a schematic diagram illustrating an example of a state of communication disconnection after a virtual FW is migrated, according to an embodiment. FIG. 14 is a schematic diagram illustrating an example of FDB update performed by a migrated virtual FW, according to an embodiment. FIG. 15 is a schematic diagram illustrating an example of a state in which communication continues even after a virtual FW 400 is migrated, according to an embodiment.

As illustrated in FIG. 11, the physical connections in the system exemplified in this case are the same as those in the physical structure example described above with reference to FIG. 2. More specifically, the exemplified system includes L2 switches 2, 3, and 4, a router 5, physical servers 10, 20, 30, and 40, and a VM management server 7.

Each physical server 10, 20, or 30 executes a corresponding hypervisor (HV) to run a VM. More specifically, the physical server 10 runs a VM (b) 100 having a MAC address "MAC (b)" and an IP address "IP (b)". The physical server 30 runs a VM (a) 300 having a MAC address "MAC (a)" and an IP address "IP (a)".

The physical server 40 runs a virtual FW 400 having a MAC address "MAC (f)" and an IP address "IP (f)". The virtual FW 400 stores therein, as a relay rule, a rule for relaying communication between the VM (a) 300 and the VM (b) 100. In this case, the VLANs to which the VMs 100, 300, and 400 belong are assumed to have the same logical connections as those described above with reference to FIG. 3. That is, the VM (a) 300 belongs to a VLAN (X), and the VM (b) 100 belongs to a VLAN (Y). The virtual FW 400 and the VM (a) 300 are connected through the VLAN (X), and the virtual FW 400 and the VM (b) 100 are connected through the VLAN (Y).

Each L2 switch 2, 3, or 4 has an FDB and uses the FDB to relay a packet. The FDB is a database in which "VLANs", "MACs", and "ports" are associated with each other. In this case, each "VLAN" represents a VLAN-ID to which a corresponding source VM belongs, each "MAC" represents the MAC address of a corresponding destination VM, and each "port" represents the number identifying a port via which the L2 switch outputs a packet.

More specifically, the L2 switch 2 stores "Y, MAC (b), P2", "Y, MAC (a), P3", and "Y, MAC (f), P3" as "VLAN, MAC, port" of the FDB. The L2 switch 2 further stores therein "X, MAC (f), P3" as "VLAN, MAC, port" of the FDB.

Similarly, the L2 switch 3 stores "Y, MAC (b), P2", "Y, MAC (a), P1", and "Y, MAC (f), P1" as "VLAN, MAC, port" of the FDB. The L2 switch 3 further stores "X, MAC (f), P1" as "VLAN, MAC, port" of the FDB.

The L2 switch 4 also stores "Y, MAC (b), P1", "X, MAC (a), P2", and "Y, MAC (a), P3" as "VLAN, MAC, port" of the FDB. In addition, the L2 switch 4 stores "X, MAC (b), P3", "X, MAC (f), P3", and "Y, MAC (f), P3" as "VLAN, MAC, port" of the FDB.

A description will be given of an example in which, in the above-described state, the VM (a) 300 sends a packet to the VM (b) 100. In the packet sent in this case, the MAC (b) of the VM (b) 100 is set as the MAC address of the destination, and the VLAN-ID "X" of the source VM (a) 300 is set as a VLAN-ID.

A packet sent from the VM (a) 300 is received via the port P2 of the L2 switch 4. The L2 switch 4 obtains the "MAC (b)" of the destination and the VLAN-ID "X" of the source from the received packet and identifies that the port corresponding thereto is the port P3, based on the FDB. The L2 switch 4 sends the received packet via the port P3.

The packet sent via the port P3 of the L2 switch 4 arrives at the virtual FW 400. On the basis of a relay rule, the virtual FW 400 determines that the received packet is to be relayed, and relays the packet to the L2 switch 4, which is the source thereof, without terminating the packet. In this case, the virtual FW 400 rewrites the VLAN-ID set in the header in the packet, from the VLAN-ID "X" of the source VM (a) 300 to the VLAN-ID "Y" of the destination VM (b) 100. A packet is relayed between different VLANs, as described above.

The L2 switch 4 receives, via the port P3, the packet in which the VLAN-ID has been rewritten from "X" to "Y". The L2 switch 4 then obtains the "MAC (b)" of the destination and the VLAN-ID "Y" of the source from the packet and identifies that the port corresponding thereto is the port P1, based on the FDB. The L2 switch 4 then sends the received packet via the port P1.

Subsequently, the L2 switch 2 receives, via the port P3, the packet relayed by the L2 switch 4. The L2 switch 2 obtains the "MAC (b)" of the destination and the VLAN-ID "Y" of the source from the packet and identifies that the port corresponding thereto is the port P2, based on the FDB. The L2 switch 2 then sends the received packet via the port P2.

Subsequently, the L2 switch 3 receives, via the port P1, the packet relayed by the L2 switch 2. Upon receiving the packet, the L2 switch 3 obtains the "MAC (b)" of the destination and the VLAN-ID "Y" of the source from the packet and identifies that the port corresponding thereto is the port P2, based on the FDB. The L2 switch 3 then sends the received packet via the port P2.

Thereafter, the packet that the L2 switch 3 has sent via the port P2 arrives at the physical server 10 connected to the port P2 of the L2 switch 3 and is received by the VM (b) 100. Communication between the different VLANs is relayed by the virtual FW 400, as described above.

Next, a description will be given of an example in which the virtual FW 400 is migrated from the physical server 40 to the physical server 20, as illustrated in FIG. 12. More specifically, the VM management server 7 sends, to the HV in the physical server 40, a migration instruction for migrating the virtual FW 400 to the physical server 20. In response to the migration instruction, memory copy and so on are executed between the HV in the physical server 40 and the HV in the physical server 20. As a result, the virtual FW 400 migrates from the physical server 40 to the physical server 20.

When the migration of the virtual FW 400 is completed, the HV in the migration-destination physical server 20 broadcasts GARP packets corresponding to the virtual FW 400. More specifically, since the virtual FW 400 has two interfaces, that is, the VLAN (Y) and the VLAN (X), the HV in the physical server 20 broadcasts two GARP packets.

For example, the HV in the physical server 20 broadcasts a GARP packet (denoted by "GARP(X, f)" in FIG. 12) containing the IP address "IP (f)" and the MAC address "MAC (f)" of the virtual FW 400 and the VLAN-ID "X" to which the virtual FW 400 belongs. Similarly, the HV in the physical server 20 broadcasts a GARP packet (denoted by "GARP(Y, f)" in FIG. 12) containing the IP address "IP (f)" and the MAC address "MAC (f)" of the virtual FW 400 and the VLAN-ID "Y" to which the virtual FW 400 belongs.

The GARP packets sent by the HV in the physical server 20 are broadcast and are thus received by the L2 switches. Upon receiving the GARP packet "X, IP (f), MAC (f)" (denoted by "GARP(X, f)" in FIG. 12) and the GARP packet "Y, IP (f), MAC (f)" (denoted by "GARP(Y, f)" in FIG. 12), each L2 switch executes rewriting of the corresponding FDB.

More specifically, the L2 switch 3 receives, via the port P3 thereof, the GARP packet "X, IP (f), MAC (f)" and the GARP packet "Y, IP (f), MAC (f)". Thus, the L2 switch 3 rewrites, in the FDB, the port "P1" corresponding to "X, IP (f), MAC (f)" to "P3" via which the GARP packet has been received. Similarly, the L2 switch 3 rewrites, in the FDB, the port "P1" corresponding to "Y, IP (f), MAC (f)" to "P3" via which the GARP packet has been received.

The L2 switch 2 also receives, at the port "P2", the GARP packet "X, IP (f), MAC (f)" and the GARP packet "Y, IP (f), MAC (f)" via the L2 switch 3. Thus, the L2 switch 2 rewrites, in the FDB, the port "P3" corresponds to the "X, IP (f), MAC (f)" to "P2" via which the GARP packet has been received. Similarly, the L2 switch 2 rewrites, in the FDB, the port "P3" corresponding to "Y, IP (f), MAC (f)" to "P2" via which the GARP packet has been received.

The L2 switch 4 also receives, via the port P1, the GARP packet "X, IP (f), MAC (f)" and the GARP packet "Y, IP (f), MAC (f)" through the L2 switch 3 and the L2 switch 2. Thus, the L2 switch 4 rewrites, in the FDB, the port "P3" corresponding to "X, IP (f), MAC (f)" to "P1" via which the GARP packet has been received. Similarly, the L2 switch 4 rewrites, in the FDB, the port "P3" corresponding to "Y, IP (f), MAC (f)" to "P1" via which the GARP packet has been received.

When the virtual FW 400 has been migrated from the physical server 40 to the physical server 20, the HV in the migration-destination physical server 20 sends the GARP packets, as described above. As a result, each L2 switch is able to rewrite the port via which a packet addressed to the virtual FW 400 is to be output so that the packet arrives at the migration-destination physical server 20.

This allows a packet in which the "MAC (f)" and the "IP (f)" of the virtual FW 400 are set as a destination, to arrive at the migration-destination physical server 20.

In this state, however, a packet whose destination is the "VM (a) 300" or the "VM (b) 100", which is to be relayed by the virtual FW 400, does not arrive at the virtual FW 400. An example in which a packet is sent from the VM (b) 100 to the VM (a) 300 and an example in which a packet is sent from the VM (a) 300 to the VM (b) 100 will now be described with reference to FIG. 13.

The FDBs in the L2 switches illustrated in FIG. 13 are in the same state as the state illustrated in FIG. 12. That is, the L2 switches are in the state in which update of the FDBs has been executed based on the GARP packets corresponding to the migrated virtual FW 400.

First, a description will first be given of an example in which, in such a state, a packet is sent from the VM (a) 300 to the VM (b) 100. In the packet sent in this example, the MAC (b) of the VM (b) 100 is set as the MAC address of the destination, the IP (b) of the VM (b) 100 is set as the IP address of the destination, and the VLAN-ID "X" of the source VM (a) 300 is set as the VLAN-ID.

The packet sent from the VM (a) 300 is received by the port P2 of the L2 switch 4. The L2 switch 4 obtains the "MAC (b)" of the destination and the VLAN-ID "X" of the source from the packet and identifies that the port corresponding thereto is the port P3, based on the FDB. The L2 switch 4 then sends the received packet via the port P3.

The packet sent via the port P3 of the L2 switch 4 arrives at the physical server 40. However, the virtual FW 400 has been already migrated from the physical server 40 to the physical server 20 and does not exist on the physical server 40. Thus, the packet sent via the port P3 of the L2 switch 4 is discarded by the physical server 40. Thus, the packet sent from the VM (a) 300 to the VM (b) 100 does not arrive at the virtual FW 400.

Next, a description will be given of an example in which a packet is sent from the VM (b) 100 to the VM (a) 300. In the packet sent in this example, the MAC (a) of the VM (a) 300 is set as the MAC address of the destination, the IP (a) of the VM (a) 300 is set as the IP address of the destination, and the VLAN-ID "Y" of the source VM (b) 100 is set as the VLAN-ID.

The packet sent from the VM (b) 100 is received by the port P2 of the L2 switch 3. The L2 switch 3 obtains the "MAC (a)" of the destination and the VLAN-ID "Y" of the source from the packet and identifies that the port corresponding thereto is the port P1, based on the FDB. The L2 switch 3 then sends the received packet via the port P1.

Subsequently, the L2 switch 2 receives, via the port P2, the packet relayed by the L2 switch 3. Upon receiving the packet, the L2 switch 2 obtains the "MAC (a)" of the destination and the VLAN-ID "Y" of the source from the packet and identifies that the port corresponding thereto is the port P3, based on the FDB. The L2 switch 2 then sends the received packet via the port P3.

Subsequently, the L2 switch 4 receives, via the port P1, the packet relayed by the L2 switch 2. Upon receiving the packet, the L2 switch 4 obtains the "MAC (a)" of the destination and the VLAN-ID "Y" of the source from the packet and identifies that the port corresponding thereto is the port P3, based on the FDB. The L2 switch 4 then sends the received packet via the port P3.

The packet sent via the port P3 of the L2 switch 4 arrives at the physical server 40. However, the virtual FW 400 has been already migrated from the physical server 40 to the physical server 20 and does not exist on the physical server 40. Thus, the packet sent via the port P3 of the L2 switch 4 is discarded by the physical server 40. Thus, the packet sent from the VM (b) 100 to the VM (a) 300 does not arrive at the virtual FW 400.

Accordingly, when the migration is completed, the virtual FW 400 broadcasts information regarding the VMs whose information is stored in the relay rule, so as to cause the L2 switches to update the FDBs.

A description will be given with reference to FIG. 14. As illustrated in FIG. 14, upon receiving a notification indicating the migration completion from the VM management server 7 or the like, the virtual FW 400 refers to the relay-rule DB 403. The virtual FW 400 then identifies a relay rule for relaying between the VM (a) 300 and the VM (b) 100, from among the relay rules stored in the relay-rule DB 403, and broadcasts FDB-rewriting a GARP packet for each of the VM (a) 300 and VM (b) 100 corresponding the identified relay rule.

More specifically, the virtual FW 400 generates an FDB-rewriting GARP packet for rewriting the path from the VM (a) 300 to the VM (b) 100. For example, the virtual FW 400 broadcasts an FDB-rewriting GARP packet containing the IP address "IP (a)" and the MAC address "MAC (a)" of the VM (a) 300 serving as a source, and the VLAN-ID "Y" to which the VM (b) 100 serving as a destination belongs.

Similarly, the virtual FW 400 generates an FDB-rewriting GARP packet for rewriting the path from the VM (b) 100 to the VM (a) 300. For example, the virtual FW 400 broadcasts an FDB-rewriting GARP packet containing the IP address "IP (b)" and the MAC address "MAC (b)" of the VM (b) 100 serving as a source, and the VLAN-ID "X" to which the VM (a) 300 serving as a destination belongs.

Since the FDB-rewriting GARP packets are broadcast by the virtual FW 400, they are received by each of the L2 switches. Upon receiving the FDB-rewriting GARP packet "Y, IP (a), MAC (a)" (denoted by "GARP(Y, a)" in FIG. 14) and the FDB-rewriting GARP packet "X, IP (b), MAC (b)" (denoted by "GARP(X, b)" in FIG. 14), each L2 switch executes rewriting of the FDB thereof.

More specifically, the L2 switch 3 receives, via the port P3, the FDB-rewriting GARP packet "Y, MAC (a)" and the FDB-rewriting GARP packet "X, MAC (b)". Thus, the L2 switch 3 rewrites, in the FDB, the port "P1" corresponding to "Y, MAC (a)" to "P3" via which the FDB-rewriting GARP packet has been received. Since a port corresponding to "X, MAC (b)" does not exist in the FDB, the L2 switch 3 newly generates an entry in which "X, MAC (b)" and "P3" via which the FDB-rewriting GARP packet has been received are associated with each other.

The L2 switch 2 also receives, via the port P2, the FDB-rewriting GARP packet "Y, MAC (a)" and the FDB-rewriting GARP packet "X, MAC (b)" through the L2 switch 3. Thus, the L2 switch 2 rewrites, in the FDB, the port "P3" corresponding to "Y, MAC (a)" to "P2" via which the FDB-rewriting GARP packet has been received. Since a port corresponding to "X, MAC (b)" does not exist in the FDB, the L2 switch 2 also newly generates an entry in which "X, MAC (b)" and "P2" via which the FDB-rewriting GARP packet has been received are associated with each other.

The L2 switch 4 also receives, via the port P1, the FDB-rewriting GARP packet "Y, MAC (a)" and the FDB-rewriting GARP packet "X, MAC (b)" through the L2 switch 3 and the L2 switch 2. Thus, the L2 switch 4 rewrites, in the FDB, the port "P3" corresponding to "Y, MAC (a)" to "P1" via which the FDB-rewriting GARP packet has been received. Similarly, the L2 switch 4 rewrites, in the FDB, the port "P3" corresponding to "X, MAC (b)" to "P1" via which the FDB-rewriting GARP packet has been received.

When the virtual FW 400 has been migrated from the physical server 40 to the physical server 20, the virtual FW 400 sends the FDB-rewriting GARP packets, as described above. As a result, each L2 switch is able to rewrite the FDB so that a packet that is addressed to a VM and that is to be relayed by the virtual FW 400 arrives at the migration-destination physical server 20.

An example of a path for a packet sent from the VM (a) 300 to the VM (b) 100 after migration of the virtual FW 400 will be described with reference to FIG. 15. The state of the FDBs in the L2 switches illustrated in FIG. 15 is the same as the state illustrated in FIG. 14. That is, the FDBs are in a state in which, after migration of the virtual FW 400, update of the FDBs has been executed based on the GARP packets and the FDB-rewriting GARP packets.

An example in which, in such a state, a packet is sent from the VM (a) 300 to the VM (b) 100 will be described. In the packet sent in this example, the MAC (b) of the VM (b) 100 is set as the MAC address of the destination, the IP (b) of the VM (b) 100 is set as the IP address of the destination, and the VLAN-ID "X" of the source VM (a) 300 is set as the VLAN-ID.

The packet sent from the VM (a) 300 is received via the port P2 of the L2 switch 4. The L2 switch 4 obtains the "MAC (b)" of the destination and the VLAN-ID "X" of the source from the packet and identifies that the port corresponding thereto is the port P1, based on the FDB thereof. The L2 switch 4 then sends the received packet via the port P1.

Subsequently, the L2 switch 2 receives, via the port P3, the packet relayed by the L2 switch 4. Upon receiving the packet, the L2 switch 2 obtains the "MAC (b)" of the destination and the VLAN-ID "X" of the source from the packet and identifies that the port corresponding thereto is the port P2, based on the FDB thereof. The L2 switch 2 then sends the received packet via the port P2.

Subsequently, the L2 switch 3 receives, via the port P1, the packet relayed by the L2 switch 2. Upon receiving the packet, the L2 switch 3 obtains the "MAC (b)" of the destination and the VLAN-ID "X" of the source from the packet and identifies that the port corresponding thereto is the port P3, based on the FDB thereof. The L2 switch 3 then sends the received packet via the port P3.

Thereafter, the packet sent via the port P3 of the L2 switch 3 arrives at the virtual FW 400 on the physical server 20. The virtual FW 400 determines that the arrived packet is to be relayed, based on the corresponding relay rule, and relays the packet to the source L2 switch 3 without terminating the packet. In this case, the virtual FW 400 rewrites the VLAN-ID set in the header in the packet, from the VLAN-ID "X" of the source VM (a) 300 to the VLAN-ID "Y" of the destination VM (b) 100.

The L2 switch 3 receives, via the port P3, the packet in which the VLAN-ID has been rewritten from "X" to "Y". Upon receiving the packet, the L2 switch 3 obtains the "MAC (b)" of the destination and the VLAN-ID "Y" of the source from the packet and identifies that the port corresponding thereto is the port P2, based on the FDB thereof. The L2 switch 3 then sends the received packet via the port P2.

Thereafter, the packet that the L2 switch 3 has sent via the port P2 arrives at the physical server 10 connected to the port P2 of the L2 switch 3 and is received by the VM (b) 100.

As described above, when the virtual FW 400 has been migrated from one physical server to another, the virtual FW 400 sends the FDB-rewriting GARP packets, in addition to the general GARP packets sent by the HV. Thus, each L2 switch is able to update the FDB for the VMs relay-controlled by the virtual FW 400, in addition to the FDB regarding the migrated virtual FW 400. As a result, even after the virtual FW 400 has been migrated to another physical server, the virtual FW 400 is able to relay communication between the VMs belonging to the different VLANs.

More specifically, when the virtual FW 400 is migrated while the VM (a) 300 and the VM (b) 100 communicate with each other, entries for the VM (a) 300 and the VM (b) 100 are updated based on the FDB-rewriting GARP packets sent from the virtual FW 400. As a result, a packet is transferred to the latest location of the virtual FW 400. Thus, even when the virtual FW 400 is migrated, communication between the VM (a) 300 and the VM (b) 100 may be maintained.

In addition, since the virtual FW 400 sends the FDB-rewriting GARP packets after the HV sends the GARP packets, it is possible to suppress transmission of the FDB-rewriting GARP packets before migration of the virtual VW 400 is completed. As a result, each L2 switch is able to rewrite the FDB regarding VMs between which communication is to be relayed by the virtual FW 400 after rewriting the FDB regarding a migrated virtual FW 400. Thus, it is possible to reduce a probability that communication between VMs is disconnected depending on the rewriting timing of the FDB.

In addition, since the migrated virtual FW 400 sends the FDB-rewriting GARP packets, it is possible to omit a time during which the HV refers to the relay rule for the virtual FW 400. As a result, the processing time may be reduced compared with a case in which the HV sends FDB-rewriting GARP packets.

Second Embodiment

Although an example in which the VM management server 7 sends a migration completion notification to the migrated virtual FW 400 has been described in the first embodiment, the present disclosure is not limited thereto. For example, the HV in the migration destination may also send a migration completion notification.

Figure 16:
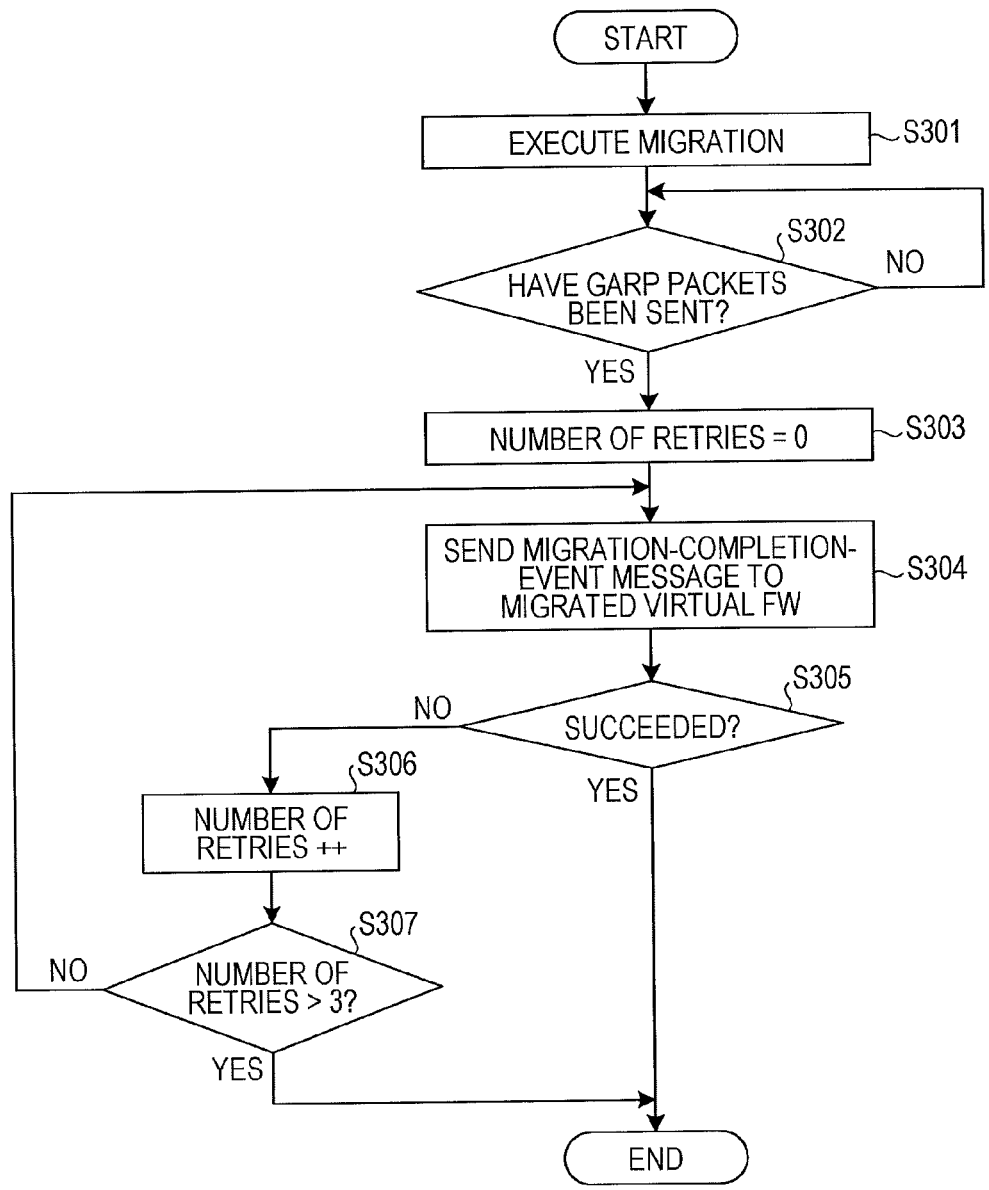
FIG. 16 is a diagram illustrating an example of an operational flowchart for processing executed by a migration-destination physical server, according to a second embodiment.
Figure 17:
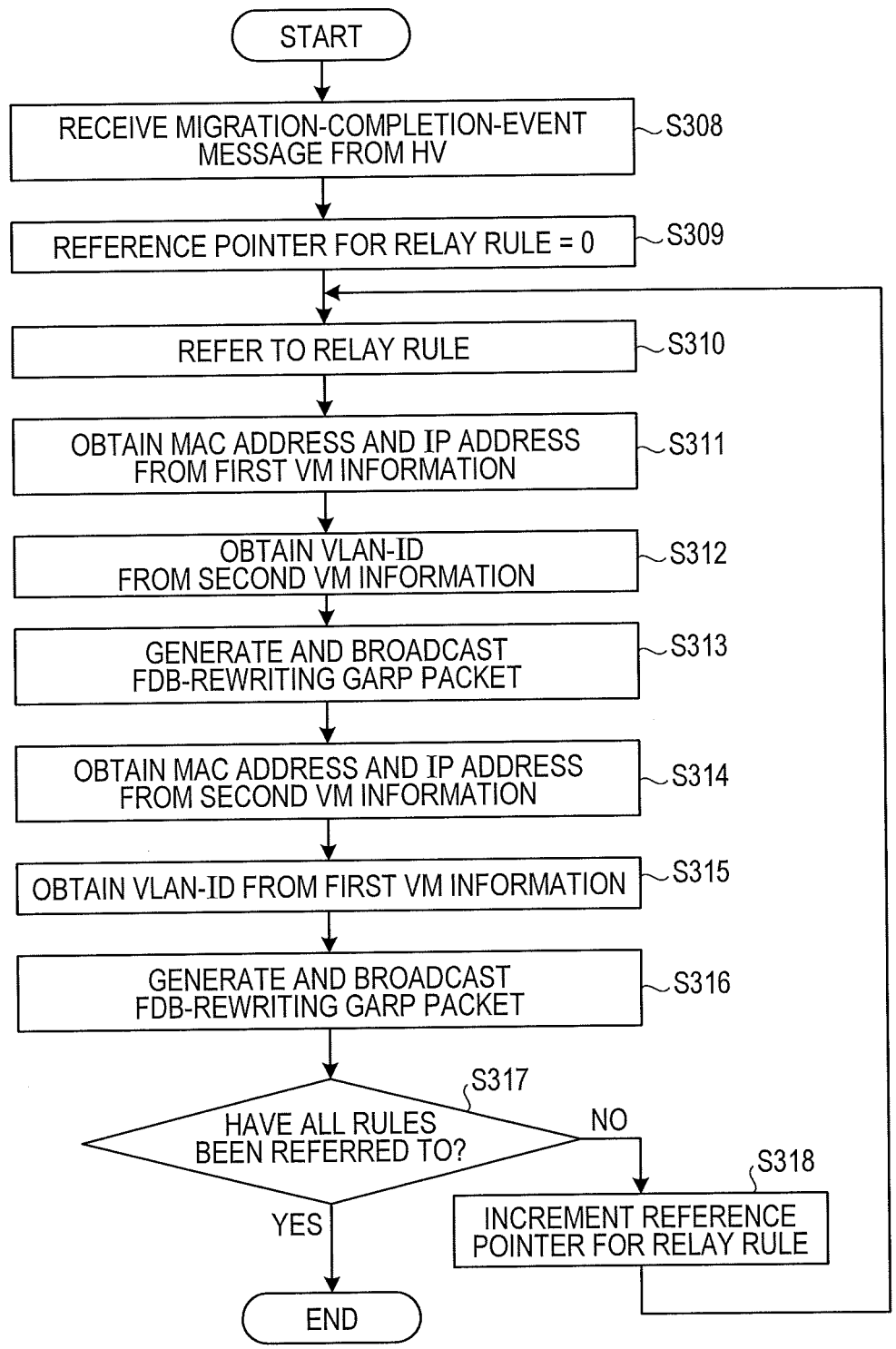
FIG. 17 is a diagram illustrating an example of an operational flowchart for processing executed by a migrated virtual FW, according to a second embodiment.

Accordingly, in a second embodiment, a description will be given of an example in which the HV in the migration-destination physical server 20 sends a migration completion notification to the migrated virtual FW 400. FIG. 16 is a diagram illustrating an example of an operational flowchart for processing executed by a migration-destination physical server, according to a second embodiment. FIG. 17 is a diagram illustrating an example of an operational flowchart for processing executed by a migrated virtual FW, according to a second embodiment. S301 to S307 are processes executed by the HV.

As illustrated in FIG. 16, the HV in the migration-destination physical server 20 executes migration in response to an instruction from the VM management server 7 (in S301). Upon executing migration, the HV determines whether GARP packets have been sent (in S302). That is, the HV determines whether transmission of GARP packets has been executed in response to completion of the migration.

Upon determining that GARP packets have been sent (YES in S302), the HV sets the number of retries at 0 (in S303). Subsequently, the HV sends a migration-completion-event message to the IP address contained in the payload of the sent GARP packets, that is, to the migrated virtual FW (in S304).

The HV then determines whether transmission of the migration-completion-event message has succeeded (in S305). That is, the HV determines whether the migration-completion-event message is received by the VM corresponding to the IP address of the destination.

Upon determining that the transmission of the migration-completion-event message has not succeeded (NO in S305), the HV increments the number of retries (in S306) and determines whether the number of retries exceeds a threshold, for example, "3" (in S307).

Upon determining that the number of retries exceeds the threshold (YES in S307), the HV ends the processing. On the other hand, upon determining that the number of retries does not exceed the threshold (NO in S307), the HV repeats the process in S304 and the subsequent processes.

S308 to S318 illustrated in FIG. 17 are processes executed by the virtual FW 400. A migration-completion-event message is received from the HV (in S308). After the reception, the virtual FW 400 executes the process in S309 and the subsequent processes. Since the processes in S309 to S318 executed by the virtual FW 400 are the same as or similar to the processes in S201 to S211 described above with reference to FIG. 10, detailed descriptions thereof are not given hereinafter.

As described above, it is possible to quickly send FDB-rewriting GARP packets without using the VM management server 7, and it is also possible to minimize packet loss in communication to be relayed between the VM (a) and the VM (b), which is caused by migration of the virtual FW.

Third Embodiment

Although the first and second embodiments have been described above, the disclosed apparatus is not limited to the above-described embodiments and may be implemented in various other forms. Accordingly, other embodiments will be described below.

(FDB-Rewriting GARP Packet)

Although an example in which the virtual FW 400 uses the FDB-rewriting GARP packets to cause the FDB in each L2 switch to be rewritten has been described above in the first and second embodiments, the present disclosure is not limited thereto. For example, the virtual FW 400 may also utilize a special control packet employing the Transmission Control Protocol (TCP) or User Datagram Protocol (UDP). The virtual FW 400 may also utilize a control message based on the Hypertext Transfer Protocol (HTTP) or Simple Object Access Protocol (SOAP) in an upper layer. Similarly, the aforementioned protocols may also be employed for the migration-completion-event message described in the second embodiment.

In addition, although an example in which an FDB-rewriting GARP packet is generated for each relay rule stored in the relay-rule DB 403 has been described in the first and second embodiments, the present disclosure is not limited thereto. For example, the virtual FW 400 may also generate an FDB-rewriting GARP packet with respect to, of the relay rules, a relay rule in which the action indicates "pass". As a result, it is possible to exclude a relay rule in which the action indicates "discard" from the processing, and it is also possible to report only a path between VMs for which the relay rule indicates "pass". This makes it possible to reduce the number of packets and to reduce the processing time.

(Type of FW)

Although an example of a transparent virtual FW has been described in the first and second embodiments, the present disclosure is not limited thereto and, for example, processing that is the same as or similar to the above-described processing may also be applied to a virtual FW that terminates a packet. The present disclosure is not limited to only a firewall, but also may be applied to, for example, a relay program for relaying communication between other computers and a transmitting program for transmitting communication between other computers. The same or similar processing may also be applied to a virtual machine that executes a program as an intrusion detection system (IDS) or an intrusion prevention system (IPS).

(Payload of FDB-Rewriting GARP Packet)

Although an example of communication between the VMs belonging to different VLANs has been described in the first and second embodiments, the present disclosure is not limited thereto and may also be applied to communication between VMs belonging to a single VLAN. In such a case, the virtual FW 400 sets, in the payload of the FDB-rewriting GARP packet, the MAC address and the IP address of a first VM and the MAC address and the IP address of a second VM.

(Transmission of FDB-Rewriting GARP Packet)

Although an example in which the virtual FW 400 generates and sends FDB-rewriting GARP packets has been described in the first and second embodiments, the present disclosure is not limited thereto. For example, the HV in a migration-destination physical server may read the relay rule from the migrated virtual FW 400 and generate and send an FDB-rewriting GARP packet.

(System)

Of the processes described in the above-described embodiments, all or some of the processes described above as being automatically performed may also be manually performed. In addition, all or some of the processes described above as being manually performed may also be automatically performed using a known method. In addition, the processing procedures, the control procedures, the specific names, the various types of data, and the information including parameters in the specification hereinabove and in the appended drawings may be arbitrarily changed, unless otherwise specifically stated. For example, the IP addresses, the MAC addresses, and so on illustrated in FIG. 7 are merely exemplary and illustrative and are not intended to limit numeric values and formats.

Additionally, the elements in each illustrated apparatus or device are functionally conceptual and may be configured to be physically different from those illustrated. That is, the specific forms of integration and distribution of the apparatuses/devices is not limited to the illustrated forms. That is, all or some of the apparatuses/devices may be functionally or physically distributed or integrated in an arbitrary manner, depending on various loads and use states. In addition, all or an arbitrary one of the processing functions performed by each apparatus may be realized by a CPU or a program analyzed and executed by the CPU or may be realized as wired-logic-based hardware.

(Hardware)

Figure 18:
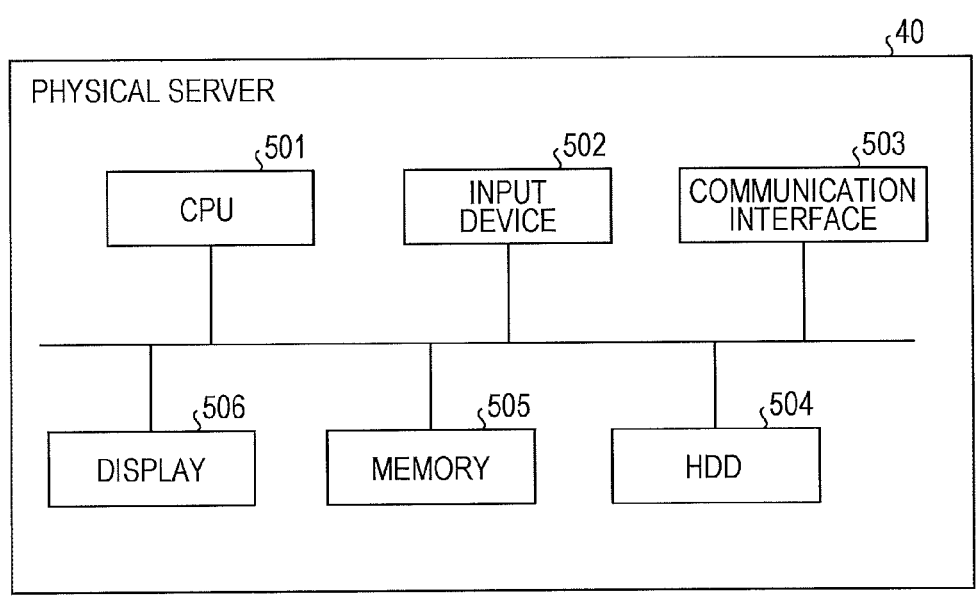
FIG. 18 is a diagram illustrating an example of a hardware configuration of a physical server, according to an embodiment.

FIG. 18 is a diagram illustrating an example of a hardware configuration of a physical server, according to an embodiment. The hardware configuration illustrated in FIG. 18 is an example of the hardware configuration of each physical server illustrated in FIG. 1 and so on. As illustrated in FIG. 18, the physical server 40 includes a CPU 501, an input device 502, a communication interface 503, a hard disk drive (HDD) 504, a memory 505, and a display 506. The elements illustrated in FIG. 18 are interconnected through a bus or the like.

The input device 502 includes, for example, a keyboard or the like, and the communication interface 503 includes, for example, a network interface card (NIC) or the like. The HDD 504 stores therein a program or programs for realizing the functions illustrated in FIG. 4 and operating the VM illustrated in FIG. 6, as well as various DBs. Although the HDD 504 has been described above as an example of a recording medium, the programs may be stored in another computer-readable recording medium, such as a read only memory (ROM), a RAM, a CD-ROM, so as to be read by the computer. The recording medium may be placed at a remote location and the computer may access the recording medium to obtain and use the programs. The computer may also store the obtained programs on a recording medium in the computer. The display 506 is a display device that displays various types of information.

The CPU 501 reads, from the HDD 504 or the like, a program for executing processing that is the same as or similar to the processing of the processing units illustrated in FIG. 4 and loads the read program in the memory 505 to thereby operate processes that implement the functions illustrated in FIG. 4 and so on. That is, the processes implement functions that are the same as or similar to those of the processing performed by the physical server 40. More specifically, the CPU 501 reads, from the HDD 504 or the like, a program having the functions that are the same as or similar to those of the HV 43. Thus, the CPU 501 executes processes that implement processing that is the same as or similar to the processing of the processing units.

The CPU 501 also reads, from the HDD 504 or the like, a program for executing processing that is the same as or similar to the processing of the processing units operated by the VM illustrated in FIG. 6 and loads the read program in the memory 505 to thereby operate processes that implement the functions illustrated in FIG. 6 and so on. That is, the processes implement functions that are the same as or similar to those of the processing performed by the virtual FW 400. More specifically, the CPU 501 reads, from the HDD 504 or the like, a program having functions that are the same as or similar to those of the input interface 401, the output interface 402, the relay processing unit 404, the migration detecting unit 405, the rewriting-packet generating unit 406, and the inserting unit 407. The CPU 501 then executes processes that implement processing that is the same as or similar to those of the processing units.

By reading and executing the program in the manner described above, the physical server 40 operates as an information processing apparatus that executes a virtual-machine control method. The physical server 40 may also realize the functions that are the same as or similar to those in the above-described embodiments by reading the program from the recording medium via a medium reading device and executing the read program. The program used in this embodiment is not limited to a program executed by the physical server 40. For example, the present disclosure may also be applied to a case in which another computer or server execute the program or a case in which another computer and another server execute the program in cooperation with each other.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute a process comprising:

performing relay processing by the computer from a first server, the relay processing including relaying communication between a first node and a second node based on relay rules, the first node belonging to a network different than the second node and the first node and the second node being coupled through a plurality of relay devices;

migrating the relay processing to a migration destination in response to a request from a second computer for migrating the relay processing;

generating control information indicating communication from the second node to the first node is to be performed by the computer from the migration destination; and sending the generated control information to the plurality of relay devices.

2. The non-transitory computer-readable recording medium of claim 1, wherein the computer holds relay information for the relaying communication between the first node and the second node; and the generating is performed by generating the control information based on the relay information.

3. The non-transitory computer-readable recording medium of claim 2, wherein the computer holds the relay information that is obtained from the first server.

4. The non-transitory computer-readable recording medium of claim 2, wherein the relay information includes first information identifying the first node and second information identifying a network to which the second node belongs; and the generating is performed by generating the control information based on the first information and the second information.

5. A method performed by a computer comprising:
performing relay processing by the computer from a first server, the relay processing including relaying communication between a first node and a second node based on relay rules, the first node belonging to a network different than the second node and the first node and the second node being coupled through a plurality of relay devices;
migrating the relay processing to a migration destination in response to a request from a second computer for migrating the relay processing;
generating control information indicating communication from the second node to the first node is to be performed by the computer from the migration destination; and
sending the generated control information to the plurality of relay devices.

6. The method of claim 5, wherein
the method is performed by a virtual machine realized by the computer executing a virtual machine program; and
the computer notifies the virtual machine program of a request for resuming the relay processing, via a virtual machine management program for managing the virtual machine.

7. An apparatus comprising
a memory; and
a processor coupled to the memory, the processor being configured to:
perform relay processing by a computer from a first server, the relay processing including relaying communication between a first node and a second node based on relay rules, the first node belonging to a network different than the second node and the first node and the second node being coupled through a plurality of relay devices,
migrate the relay processing to a migration destination in response to a request from a second computer for migrating the relay processing
generate control information indicating communication from the second node to the first node is to be performed by the computer from the migration destination, and
send the generated control information to the plurality of relay devices.

* * * * *